United States Patent
Nishino et al.

(10) Patent No.: US 10,694,124 B2
(45) Date of Patent: Jun. 23, 2020

(54) IMAGE PICKUP ELEMENT AND ELECTRONIC APPARATUS WITH NOISE CORRECTING CIRCUIT

(71) Applicant: Sony Corporation, Tokyo (JP)

(72) Inventors: Tatsuki Nishino, Kanagawa (JP); Yosuke Ueno, Kanagawa (JP); Yusuke Moriyama, Kanagawa (JP); Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 16/083,023

(22) PCT Filed: Mar. 3, 2017

(86) PCT No.: PCT/JP2017/008430
§ 371 (c)(1),
(2) Date: Sep. 7, 2018

(87) PCT Pub. No.: WO2017/159394
PCT Pub. Date: Sep. 21, 2017

(65) Prior Publication Data
US 2019/0068902 A1 Feb. 28, 2019

(30) Foreign Application Priority Data

Mar. 17, 2016 (JP) .................. 2016-053643

(51) Int. Cl.
*H04N 5/335* (2011.01)
*H04N 5/357* (2011.01)
(Continued)

(52) U.S. Cl.
CPC ............ *H04N 5/357* (2013.01); *G05F 3/262* (2013.01); *H04N 5/341* (2013.01);
(Continued)

(58) Field of Classification Search
CPC combination set(s) only.
See application file for complete search history.

(56) References Cited

U.S. PATENT DOCUMENTS 9,148,596 B1 9/2015 Sun et al.
2004/0090281 A1* 5/2004 Vilander .................. H03B 5/04
331/185

(Continued)

FOREIGN PATENT DOCUMENTS

EP        2 568 699 A2    3/2013
JP        2013-058909 A   3/2013
(Continued)

OTHER PUBLICATIONS

International Search Report and English translation thereof dated Jun. 6, 2017 in connection with International Application No. PCT/JP2017/008430.
(Continued)

*Primary Examiner* — Gary C Vieaux
(74) *Attorney, Agent, or Firm* — Wolf, Greenfield & Sacks, P.C.

(57) ABSTRACT

The present technique relates to an image pickup element and an electronic apparatus which enable a higher-quality image to be obtained. An image pickup element includes an input sense portion configured to produce a noise correction signal portion includes a first transistor and a second transistor configuring a current mirror circuit, a switch provided between a gate of the first transistor and a gate of the second transistor, and a capacitive element one electrode of which is connected between the switch and the gate of the second transistor on an output side of the current mirror circuit, and the other electrode of which is connected to the predetermined power source.

16 Claims, 9 Drawing Sheets

(51) Int. Cl.
  *H04N 5/369* (2011.01)
  *H04N 5/378* (2011.01)
  *G05F 3/26* (2006.01)
  *H04N 5/341* (2011.01)

(52) U.S. Cl.
  CPC ......... *H04N 5/3577* (2013.01); *H04N 5/3698* (2013.01); *H04N 5/378* (2013.01)

(56) References Cited

U.S. PATENT DOCUMENTS

| | | |
|---|---|---|
| 2010/0177232 A1 | 7/2010 | Yu |
| 2013/0062503 A1* | 3/2013 | Saito .................... H04N 5/3575 250/208.1 |
| 2015/0077610 A1 | 3/2015 | Shishido et al. |
| 2015/0109505 A1 | 4/2015 | Sakuragi |
| 2015/0163436 A1 | 6/2015 | Hijikata et al. |
| 2015/0358016 A1* | 12/2015 | Balachandran ........ H03K 17/16 323/315 |
| 2016/0142661 A1 | 5/2016 | Shishido et al. |
| 2017/0060163 A1* | 3/2017 | Lintonen .............. H03K 17/163 |

FOREIGN PATENT DOCUMENTS

| | | |
|---|---|---|
| JP | 2015-233184 A | 12/2015 |
| WO | WO 2013/179573 A1 | 12/2013 |
| WO | WO 2014/038140 A1 | 3/2014 |

OTHER PUBLICATIONS

International Written Opinion dated Jun. 6, 2017 in connection with International Application No. PCT/JP2017/008430, and English translation thereof.

International Preliminary Report on Patentability dated Sep. 27, 2018 in connection with International Application No. PCT/JP2017/008430, and English translation thereof.

Extended European Search Report dated Dec. 13, 2018 in connection with European Application No. 17766397.8.

* cited by examiner

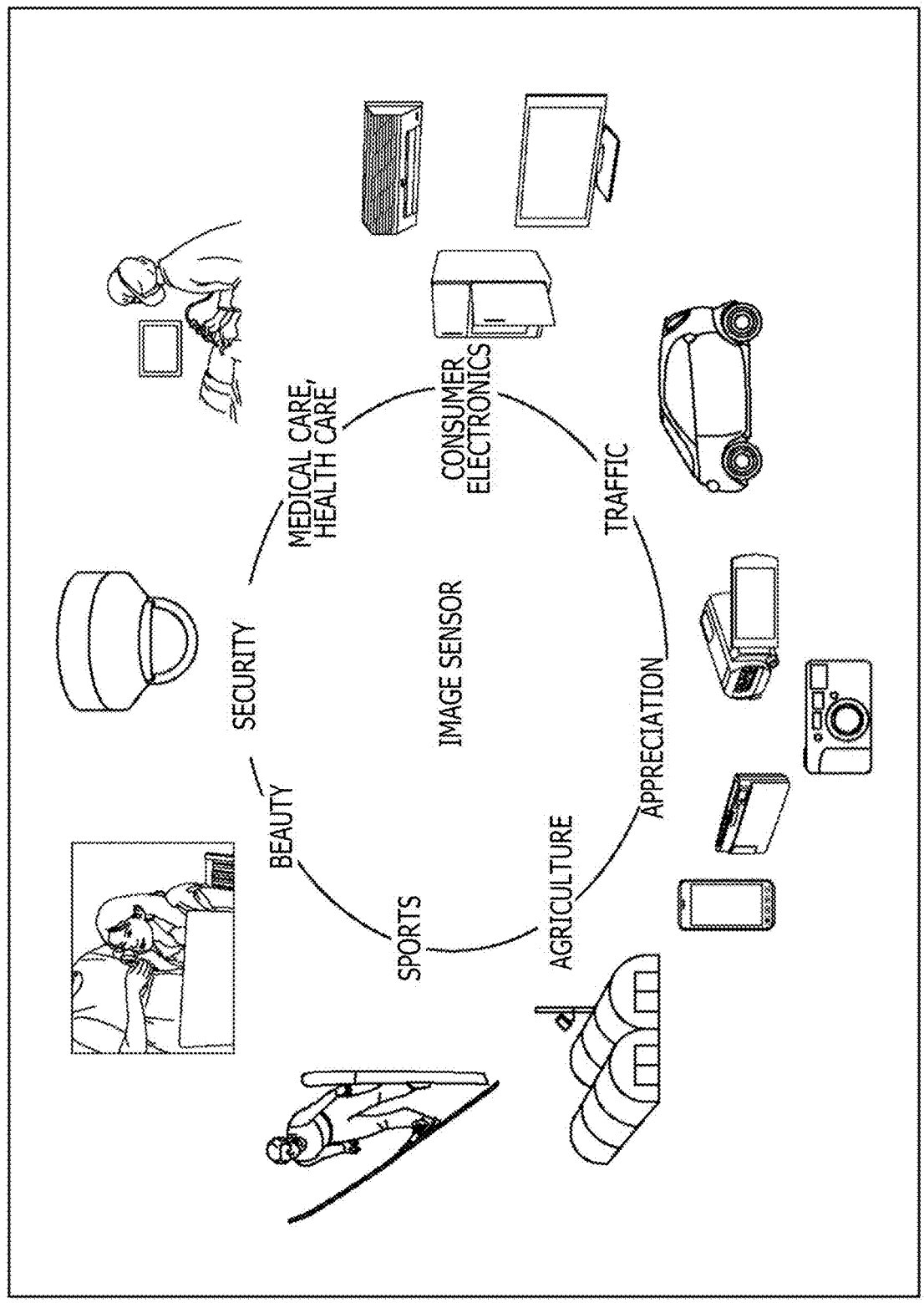

IMAGE PICKUP ELEMENT AND ELECTRONIC APPARATUS WITH NOISE CORRECTING CIRCUIT

CROSS-REFERENCE TO RELATED APPLICATIONS

This application claims the benefit under 35 U.S.C. § 371 as a U.S. National Stage Entry of International Application No. PCT/JP2017/008430, filed in the Japanese Patent Office as a Receiving Office on Mar. 3, 2017, which claims priority to Japanese Patent Application Number JP2016-053643, filed in the Japanese Patent Office on Mar. 17, 2016, each of which is hereby incorporated by reference in its entirety.

TECHNICAL FIELD

The present technique relates to an image pickup element and an electronic apparatus, and more particularly to an image pickup element and an electronic apparatus which enable a higher-quality image to be obtained.

BACKGROUND ART

Heretofore, an image pickup element such as a CCD (Charge Coupled Device) or a CMOS (Complementary Metal Oxide Semiconductor) image sensor to which a semiconductor microfabrication technology is applied has been widely adopted in a digital camera, a mobile phone and the like.

In such an image pickup element, in a photodiode provided within a pixel, light made incident to the photodiode from a subject is subjected to photoelectric conversion. A voltage signal corresponding to an amount of resulting electric charges is read out through an amplifying transistor and a vertical signal line, and is then subjected to AD (Analog to Digital) conversion by a comparator (for example, refer to PTL 1).

CITATION LIST

Patent Literature

[PTL 1]
JP 2015-233184A

SUMMARY

Technical Problems

Now, in the image pickup element described above, a power source noise which is propagated through the vertical signal line via the amplifying transistor within the pixel is large in terms of the property of the pixel, and it is possible that the amount of noise is propagated with approximately −20 to −30 dB.

For this reason, in the case where, for example, the power source noise is generated with several tens of $mV_{p-p}$ from an external power source, it is feared that the noise is propagated with approximately several millivolts through the vertical signal line, which exerts a large influence on the pixel property. That is, it is possible that the detection shift is generated at the time of the AD conversion in the comparator, and thus the image quality of the resulting image is reduced.

The present technique has been made in the light of such a situation, and enables a higher-quality image to be obtained.

Solution to Problems

An image pickup element of a first aspect of the present technique includes an input sense portion configured to produce a noise correction signal for correcting a noise generated in a predetermined power source. The input sense portion includes a first transistor and a second transistor configuring a current mirror circuit, a switch provided between a gate of the first transistor and a gate of the second transistor, and a capacitive element one electrode of which is connected between the switch and the gate of the second transistor on an output side of the current mirror circuit, and the other electrode of which is connected to the predetermined power source.

The switch can be turned ON for a period of time before correction of the noise is carried out, and can be turned OFF for a period of time for which the correction of the noise is carried out.

The input sense portion can further include a first resistor connected between the first transistor and a ground, and a second resistor connected between the second transistor and the ground.

The image pickup element can further include a delaying phase adjusting portion which includes a capacitive element and carries out adjustment of a delaying phase of the noise correction signal produced by the input sense portion.

The image pickup element can further include a leading phase adjusting portion which includes a capacitive element and carries out adjustment of a leading phase of the noise correction signal produced by the input sense portion.

The image pickup element can further include a gain adjusting portion configured to adjust a DC gain of the noise correction signal.

The image pickup element can further include a DC cutting portion configured to cut a DC component of the noise correction signal produced by the input sense portion.

The image pickup element can further include a pixel circuit which is connected to the predetermined power source, subjects incident light to photoelectric conversion, and outputs a pixel signal responding to quantity of the received light, a reference signal producing portion configured to produce a reference signal a waveform of which is changed in a form of a slope, and a comparator configured to compare the reference signal on which the noise correction signal is superimposed, and the pixel signal with each other, and output the comparison result as a digital pixel signal.

The image pickup element can further include a DC force portion configured to force a current and invert a phase of the noise correction signal produced by the input sense portion.

The image pickup element can further include a pixel circuit which is connected to a power source different from the predetermined power source, subjects incident light to photoelectric conversion, and outputs a pixel signal responding to quantity of the received light, a reference signal producing portion which is connected to the predetermined power source and produces a reference signal a waveform of which is changed in a form of a slope, and a comparator configured to compare the reference signal on which the noise correction signal a phase of which is inverted by the DC force portion is superimposed, and the pixel signal with each other, and output the comparison result as a digital pixel signal.

In the first aspect of the present technique, the noise correction signal for correcting the noise generated in the predetermined power source is produced by the input sense portion. The input sense portion includes a first transistor and a second transistor configuring a current mirror circuit, a switch provided between a gate of the first transistor and a gate of the second transistor, and a capacitive element one electrode of which is connected between the switch and the gate of the second transistor on an output side of the current mirror circuit, and the other electrode of which is connected to the predetermined power source.

An electronic apparatus of a second aspect of the present technique includes an input sense portion configured to produce a noise correction signal for correcting a noise generated in a predetermined power source. The input sense portion includes a first transistor and a second transistor configuring a current mirror circuit, a switch provided between a gate of the first transistor and a gate of the second transistor, and a capacitive element one electrode of which is connected between the switch and the gate of the second transistor on an output side of the current mirror circuit, and the other electrode of which is connected to the predetermined power source.

In the second aspect of the present technique, the noise correction signal for correcting the noise generated in the predetermined power source is produced by the input sense portion. The input sense portion includes a first transistor and a second transistor configuring a current mirror circuit, a switch provided between a gate of the first transistor and a gate of the second transistor, and a capacitive element one electrode of which is connected between the switch and the gate of the second transistor on an output side of the current mirror circuit, and the other electrode of which is connected to the predetermined power source.

An image pickup element of a third aspect of the present technique includes an input sense portion configured to produce a noise correction signal for correcting a noise generated in a predetermined power source. The input sense portion includes a second transistor connected to a gate of a first transistor conductance of which is made constant, a switch provided between the gate of the first transistor and a gate of the second transistor, and a capacitive element one electrode of which is connected between the switch and the gate of the second transistor, and the other electrode of which is connected to the predetermined power source.

The switch can be turned ON for a period of time before correction of the noise is carried out, and can be turned OFF for a period of time for which the correction of the noise is carried out.

The image pickup element can further include a delaying phase adjusting portion which includes a capacitive element and carries out adjustment of a delaying phase of the noise correction signal produced by the input sense portion.

The image pickup element can further include a leading phase adjusting portion which includes a capacitive element and carries out adjustment of a leading phase of the noise correction signal produced by the input sense portion.

The image pickup element can further include a gain adjusting portion configured to adjust a DC gain of the noise correction signal.

The image pickup element can further include a DC cutting portion configured to cut a DC component of the noise correction signal produced by the input sense portion.

The image pickup element can further include a pixel circuit which is connected to the predetermined power source, subjects incident light to photoelectric conversion, and outputs a pixel signal responding to quantity of the received light, a reference signal producing portion configured to produce a reference signal a waveform of which is changed in a form of a slope, and a comparator configured to compare the reference signal on which the noise correction signal is superimposed, and the pixel signal with each other, and output the comparison result as a digital pixel signal.

In the third aspect of the present technique, the noise correction signal for correcting the noise generated in the predetermined power source is produced by the input sense portion. The input sense portion includes a second transistor connected to a gate of a first transistor conductance of which is made constant, a switch provided between the gate of the first transistor and a gate of the second transistor, and a capacitive element one electrode of which is connected between the switch and the gate of the second transistor, and the other electrode of which is connected to the predetermined power source.

Advantageous Effects of Invention

According to the first aspect to the third aspect of the present technique, the higher-quality image can be obtained.

BRIEF DESCRIPTION OF DRAWINGS

FIG. 10 is a view depicting examples of use each using a solid-state image pickup element.

DESCRIPTION OF EMBODIMENTS

Hereinafter, a description will be given with respect to embodiments to each of which the present technique is applied.

First Embodiment

<Example of Configuration of Image Pickup Element>

The present technique relates to an image pickup element, and an electronic apparatus such as an image pickup apparatus or a mobile phone which is provided with the image pickup element. More particularly, the present technique reduces the reduction of image quality of an image caused by propagation of a noise generated from a power source, thereby enabling a higher-quality image to be obtained.

In the present technique, a target power source noise is mainly a noise of a pixel power source which is propagated through a vertical signal line via an amplifying transistor within a pixel of an image pickup element to cause detection shift of a comparator, and has an element which causes the reduction of image quality due to the detection shift in the comparator or the like. The present technique is a technique with which the noise cancelation can be carried out simply and with high accuracy against the power source noise, and at the same time, can realize low power consumption and the high versatility.

Figure 1:
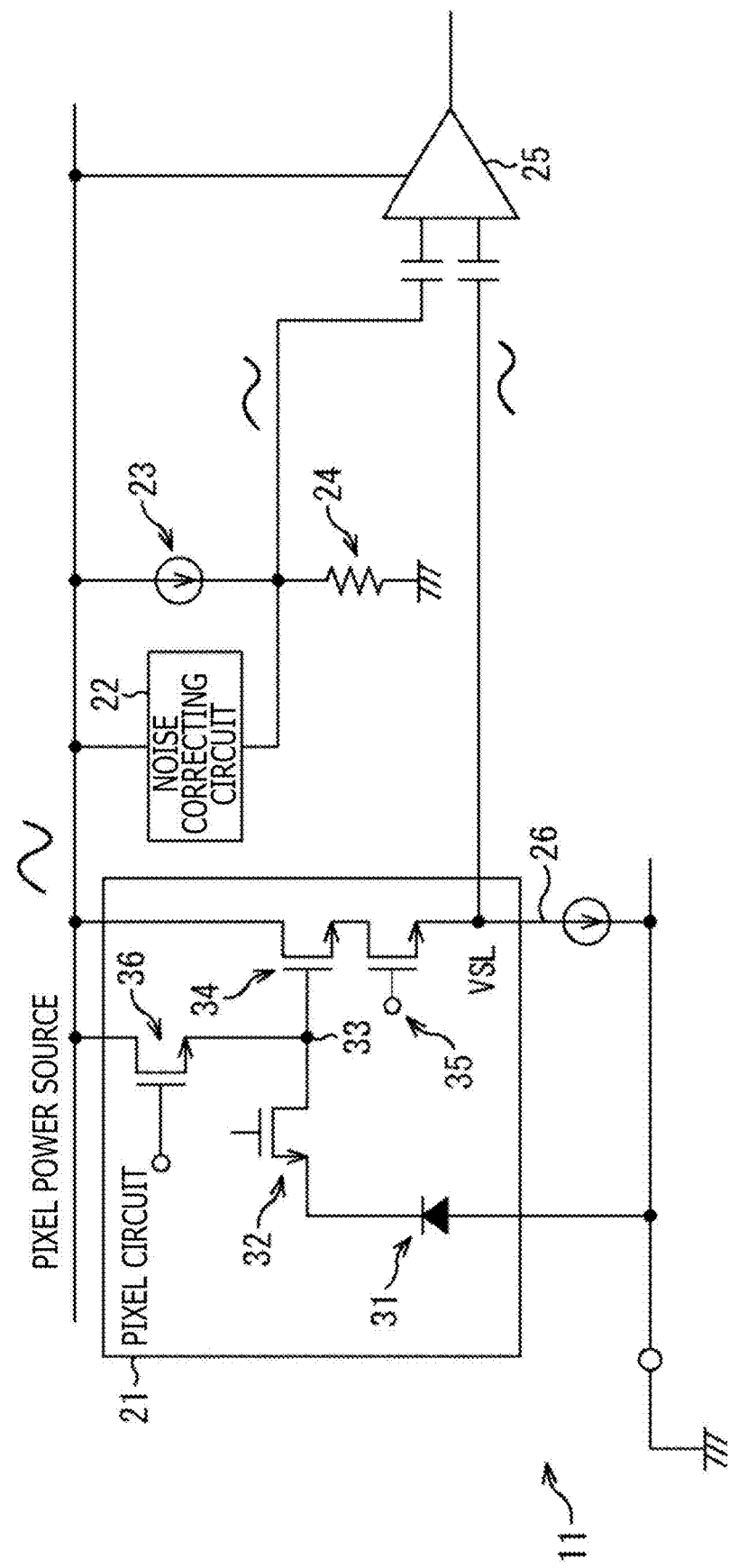
FIG. 1 is a circuit diagram depicting an example of a configuration of an image pickup element.

FIG. 1 is a circuit diagram depicting an example of a configuration of an embodiment of an image pickup element to which the present technique is applied.

An image pickup element 11 depicted in FIG. 1, for example, includes a CCD, a CMOS image sensor or the like. The image pickup element 11 has a pixel circuit 21, a noise correcting circuit 22, a constant current source 23, a resistor 24, a comparator 25, and a vertical signal line 26.

It should be noted that in more detail, the image pickup element 11 is provided with a plurality of pixel circuits 21 (not depicted). In addition, although the image pickup element 11 is also provided with a plurality of AD converters including the constant current sources 23 to the comparators 25 for AD-converting the inputs from these pixel circuits 21, illustration thereof is omitted here.

The pixel circuit 21 subjects light made incident thereto from a subject to photoelectric conversion and produces a pixel signal responding to received light quantity of incident light. The pixel circuit 21 has a photodiode 31, a transfer transistor 32, a floating diffusion region 33, an amplifying transistor 34, a selection transistor 35, and a reset transistor 36.

In the pixel circuit 21, the photodiode 31 and the floating diffusion region 33 are connected to each other through the transfer transistor 32. In addition, the reset transistor 36 is connected between the floating diffusion region 33 and a pixel power source, and also a gate of the amplifying transistor 34 is connected to the floating diffusion region 33. A drain of the amplifying transistor 34 is connected to the pixel power source, and a source of the amplifying transistor 34 is connected to a vertical signal line 26 through the selection transistor 35.

At the time of photographing of an image, the light from the subject is received by the photodiode 31 to be subjected to the photoelectric conversion, and the resulting electric charges are accumulated in the photodiode 31. Then, when a voltage is applied to the gate of the transfer transistor 32 to turn ON the transfer transistor 32, the photodiode 31 and the floating diffusion region 33 are electrically connected to each other, so that the electric charges in the photodiode 31 are transferred to the floating diffusion region 33 through the transfer transistor 32 to be converted into a voltage.

In addition, when a voltage is applied to a gate of the selection transistor 35 connected to the vertical signal line 26, a pixel signal responding to the voltage of the floating diffusion region 33 is supplied to the comparator 25 through the amplifying transistor 34, the selection transistor 35 and the vertical signal line 26. The pixel signal which is outputted from the pixel circuit 21 in such a manner is a signal the magnitude of which responds to the quantity of light received by the photodiode 31.

In addition, in the pixel circuit 21, when a voltage is applied to a gate of the reset transistor 36, the reset transistor 36 is turned ON, so that the floating diffusion region 33 and the pixel power source are electrically connected to each other, thereby resetting the floating diffusion region 33.

In the image pickup element 11, the AD converter includes the constant current source 23, the resistor 24, and the comparator 25. The pixel signal outputted from the pixel circuit 21 is converted from the analog signal to the digital signal by the AD converter.

One input terminal of the comparator 25 is connected to the vertical signal line 26 through a capacitor, and the other input terminal of the comparator 25 is connected to each of the constant current source 23, the resistor 24, and the noise correcting circuit 22 through a capacitor. In addition, the constant current source 23 is provided between the pixel power source and the comparator 25, and the resistor 24 is provided between the comparator 25 and the ground. Moreover, the noise correcting circuit 22 is provided between the pixel power source and the comparator 25.

In this example, a DAC (Digital to Analog Converter) is configured by the constant current source 23 and the resistor 24. This DAC functions as a reference signal producing portion for producing a reference signal which is used to AD-convert the pixel signal outputted from the pixel circuit 21.

At the time of the AD conversion of the pixel signal, the reference signal as a Ramp wave a waveform (voltage value) of which is changed in the form of a slope in a time direction, and is supplied to the comparator 25. The comparator 25 compares the pixel signal supplied thereto from the pixel circuit 21 through the vertical signal line 26, and the reference signal supplied thereto from the DAC with each other, and outputs a signal responding to the comparison result as the digital pixel signal. For example, at a timing at which a value of the reference signal becomes equal to or smaller than a value of the pixel signal from the pixel circuit 21, the output from the comparator 25 is inverted.

In the image pickup element 11, for example, a signal responding to a length of a period of time from start of the comparison by the comparator 25 up to inversion of the output from the comparator 25 is outputted as the final digital pixel signal obtained by receiving the light in the pixel circuit 21, in a word, as the pixel value of the pixel on the photographed image.

In addition, as described above, in the image pickup element 11, the power source noise from the pixel power source is propagated through the vertical signal line 26 via the amplifying transistor 34 and the selection transistor 35. For this reason, the power source noise is superimposed on the pixel signal outputted from the pixel circuit 21, and the resulting pixel signal is inputted to the comparator 25. As a result, the shift is caused in the timing at which the output from the comparator 25 is inverted, and thus the pixel signal having the accurate pixel value cannot be obtained.

Then, the image pickup element 11 is provided with the noise correcting circuit 22 in terms of the configuration of correcting, that is, cancelling the power source noise which is inputted to the comparator 25. The noise correcting circuit 22 produces a noise correction signal for monitoring the generation of the power source noise in the pixel power source, and cancelling (correcting) the power source noise on the basis of the power source noise generated in the pixel power source.

Then, the noise correcting circuit 22 inputs the noise correction signal thus produced to the comparator 25 through the DAC, thereby cancelling the power source noise in the comparator 25. That is, since the reference signal on which the noise correction signal is superimposed is inputted to the comparator 25, at the time of comparison of the reference signal and the pixel signal from the pixel circuit 21, the power source noise superimposed on the pixel signal is cancelled by using the noise correction signal.

<With Respect to Noise Correcting Circuit>

Figure 2:
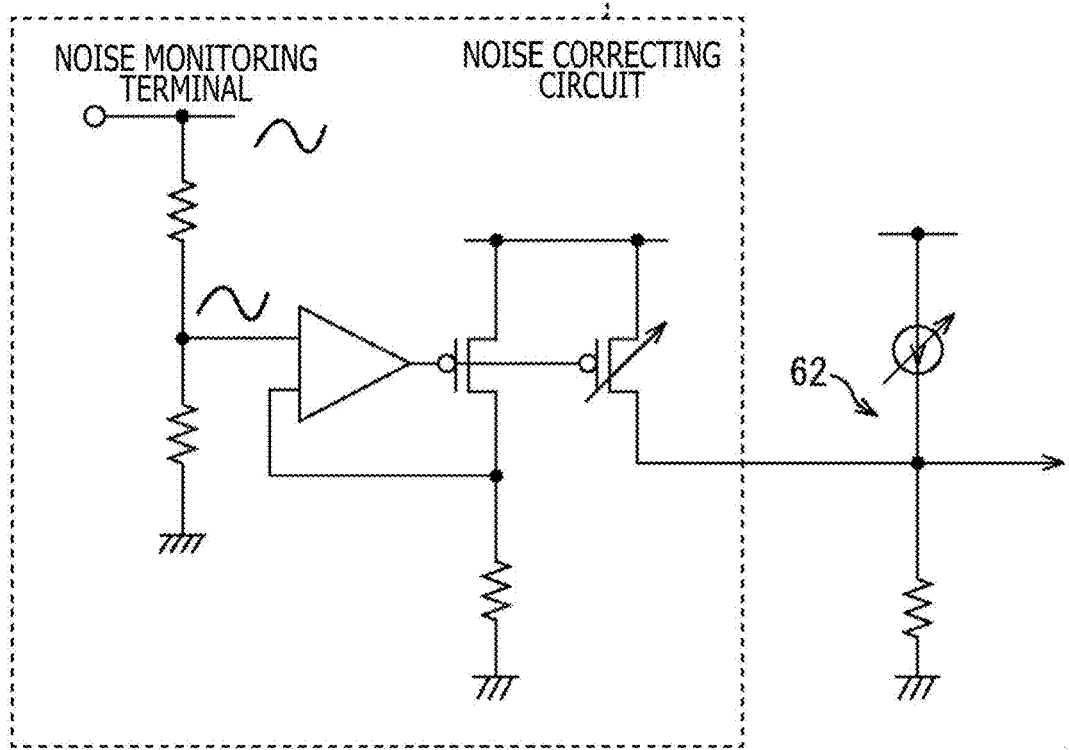
FIG. 2 is a circuit diagram explaining a noise correcting circuit.

Now, in the power source noise correction by the circuit like the noise correcting circuit 22 described above, for example, it is considered that the noise correcting circuit depicted in FIG. 2 is made to have the circuit configuration and the component which has the same amplitude and phase as those of the power source noise is produced as the noise correction signal.

A noise correcting circuit 61 depicted in FIG. 2 is connected to a comparator (not depicted) through a DAC 62 including a constant current source and a resistor. In addition, the noise correcting circuit 61 is connected to a pixel power source as well.

In the noise correcting circuit 61, the power source noise generated in the pixel power source is received by an amplifier configuration and is converted from a voltage signal into a current signal. Then, the noise correction signal as the current signal obtained through the conversion is superimposed as the AC component of the power source noise on the reference signal outputted from the DAC 62, and is inputted to the comparator.

However, with the noise correcting circuit 61 having such a configuration, it is possible that owing to the noise generated by the amplifier itself, or an increase in consumed current of the amplifier itself, the characteristics become worse. That is, since not only the consumed current is increased, but also the noise is generated in the amplifier, the power source noise cannot be cancelled (corrected) with high accuracy. In addition, it is also possible that the response characteristics of the amplifier cannot sufficiently follow the power source noise.

Figure 3:
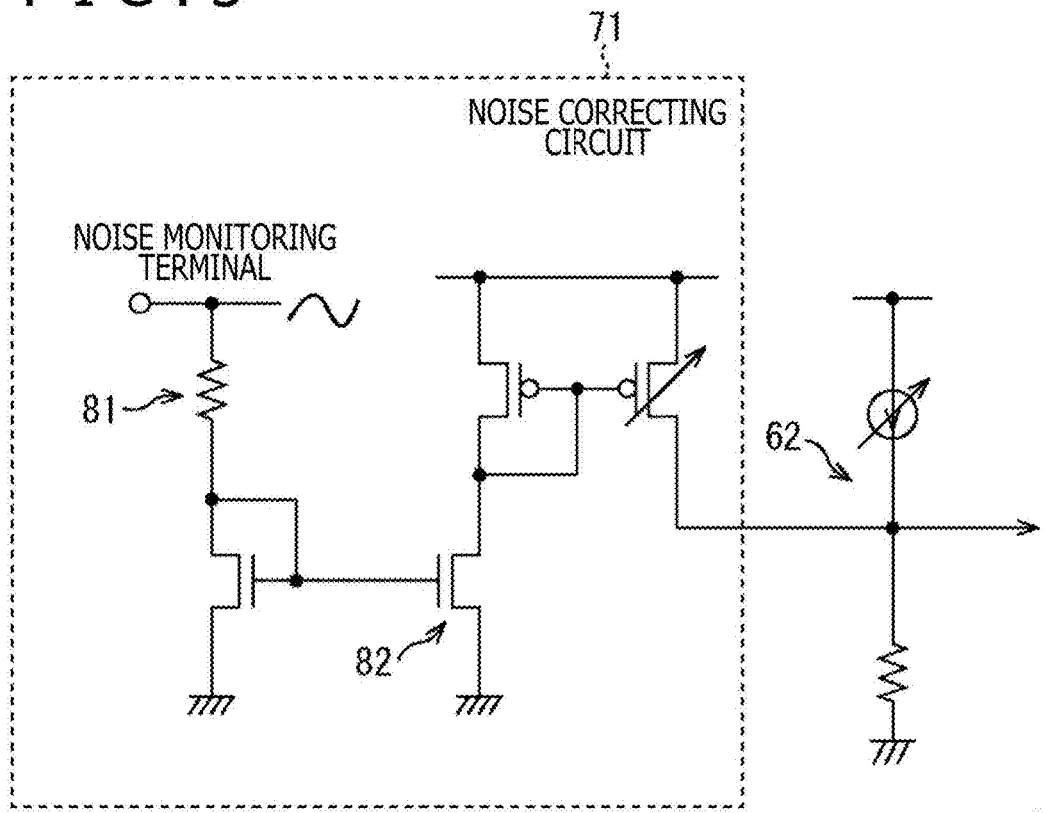
FIG. 3 is a circuit diagram explaining another noise correcting circuit.

In addition, it is also considered that the power source noise is cancelled by using a noise correcting circuit having a configuration depicted in FIG. 3 instead of the configuration using the amplifier as depicted in FIG. 2. It should be noted that in FIG. 3, portions corresponding to those in case of FIG. 2 are assigned the same reference numerals, and a description thereof is suitably omitted here.

In an example depicted in FIG. 3, a noise correcting circuit 71 is provided between the pixel power source and the DAC 62, and the noise correcting circuit 71 is provided with a resistor 81 and a transistor 82.

In the noise correcting circuit 71, the resistor 81 and a forward voltage of the transistor 82 are used to convert the power source noise as the voltage signal into the current signal. The resulting current signal is superimposed as the AC component of the power source noise, in a word, as the noise correction signal on the reference signal outputted from the DAC 62.

However, in such a noise correcting circuit 71, a large current is usually drawn therein from a noise monitoring terminal connected to the pixel power source. In a word, the large current is usually caused to flow through the noise correcting circuit 71. Such a current becomes a factor by which an increase in consumed current, and a change for the worse are caused.

In addition, the noise correcting circuit 71 has the configuration in which an amount of conversion from the voltage to the current depends on the value of the power source voltage of the noise monitor. That is, the magnitude of the current as the noise correction signal obtained in the noise correcting circuit 71 is determined by the magnitude of the resistor 81, and the magnitude of the forward voltage of the transistor 82. For this reason, with the noise correcting circuit 71, the voltage could not be converted into the current with the high accuracy, and thus the power source noise was difficult to cancel with the high accuracy.

Moreover, the components of the power source noise becoming the correction target are not usually constant for the frequency in terms of the transfer characteristics of the pixel circuit and the analog circuit. Thus, the components of the power source noise are mixed with the primary low-pass characteristics and the high-pass characteristics. That is, for example, in the image pickup element 11 depicted in FIG. 1, since the elements such as the amplifying transistor 34 laying on the path of the power source noise have the frequency characteristics, the power source noise generated in the pixel power source is not superimposed on the pixel signal as it is.

Figure 4:
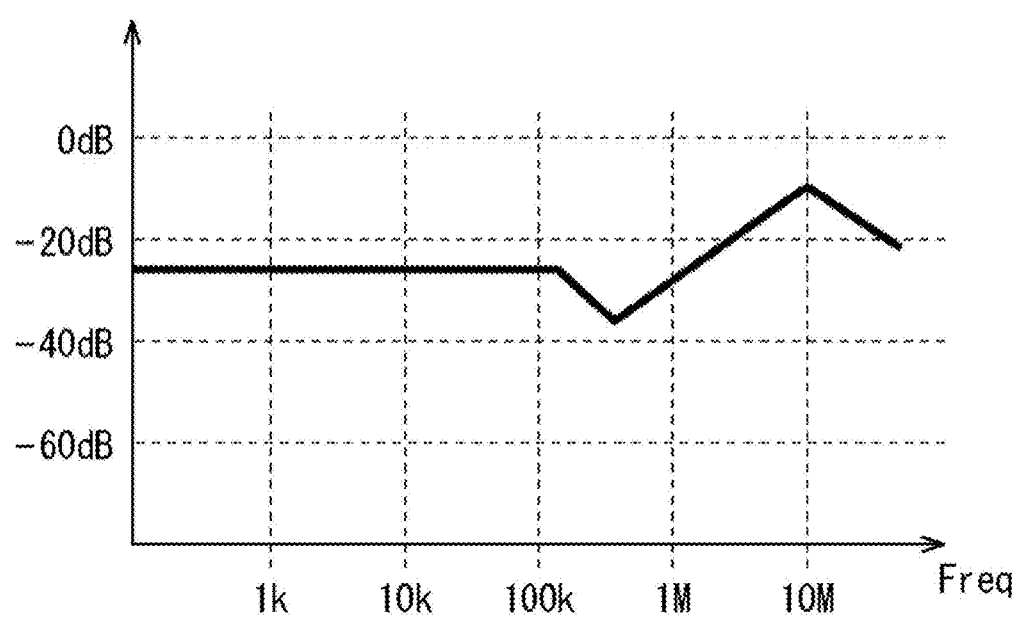
FIG. 4 is a graphical representation explaining frequency characteristics of a power source noise.

For example, the transfer path of the power source noise superimposed on the pixel signal has the transfer characteristics as depicted in FIG. 4. It should be noted that in FIG. 4, an axis of abscissa represents the frequency, and an axis of ordinate represents a gain of the noise correction signal, that is, the level of the vertical signal line 26 with respect to the power source voltage of the pixel power source.

In an example depicted in FIG. 4, it is understood that a DC gain component in a low-frequency region, and a low-pass component and a high-pass component in a high frequency region are mixed with one another in the power source noise. For example, a portion in which the gain is constant is a portion of only the DC gain component, and a high-frequency region portion, in a word, a portion in which the gain is changed in response to a change of the frequency is a portion in which the low-pass component and the high-pass component are mixed with each other.

In such a manner, the level of the power source noise which should be corrected differs every frequency. Therefore, if the noise correction signal is produced without taking the frequency characteristics of the power source noise into consideration, then, the power source noise cannot be sufficiently cancelled depending on the frequencies.

For this reason, in carrying out the noise correction for the power source noise, in a word, in cancelling the power source noise components, for the purpose of correcting the noise components over the wide frequency band in the high accuracy, it is necessary to produce the noise correction signal responding to the frequency characteristics of the power source noise for the target power source noises. That is, the gain of the noise correction signal needs to be adjusted in response to the frequency characteristics of the power source noise.

However, if such correction is desired to be carried out, then, consequently, the configuration of the noise correcting circuit becomes complicated. As a result, not only an area of the noise correcting circuit is increased, but also the current consumption of the noise correcting circuit, and the noise generated in the noise correcting circuit are increased.

<Example of Configuration of Noise Correcting Circuit>

Figure 5:
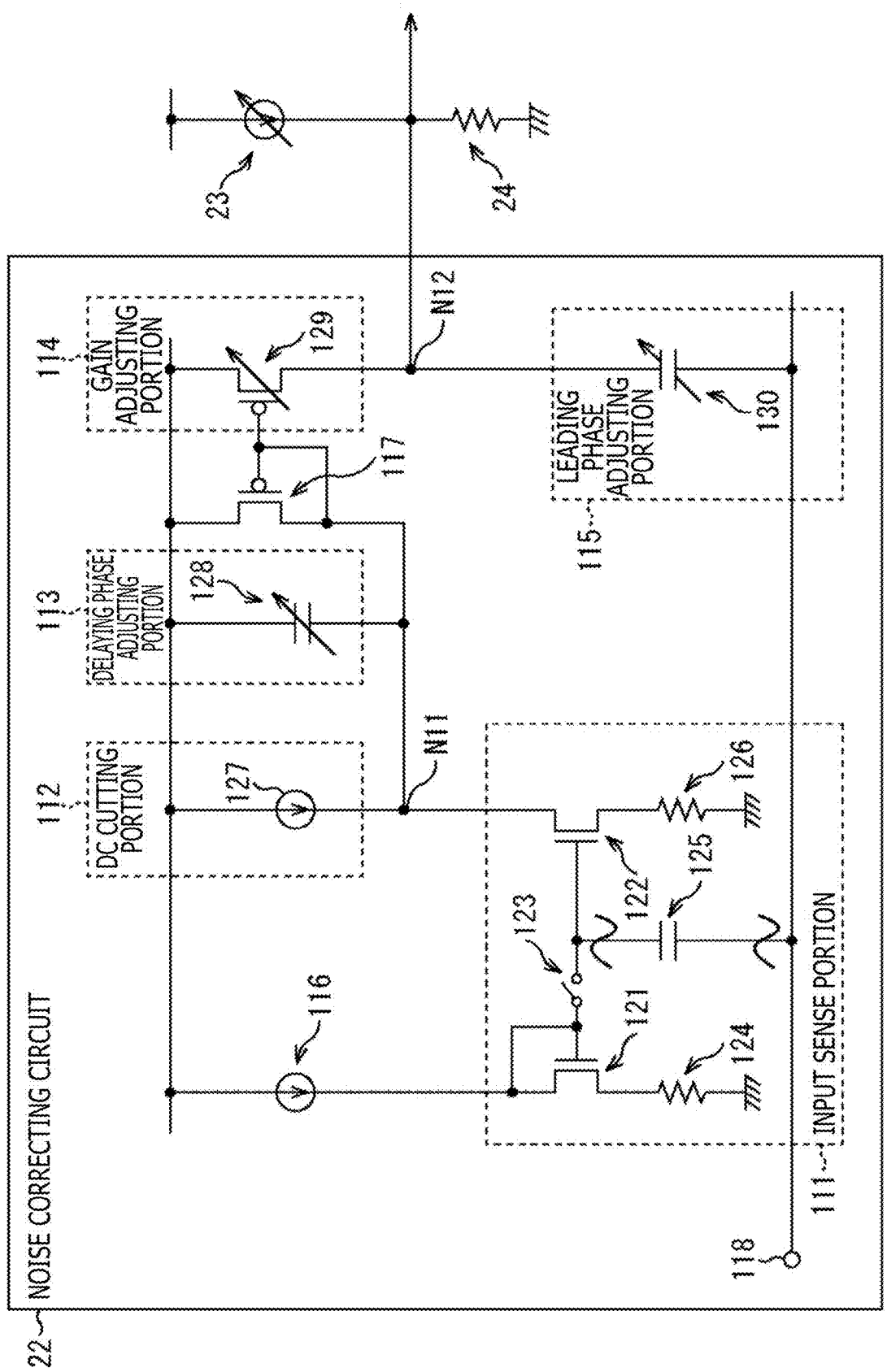
FIG. 5 is a circuit diagram depicting an example of a configuration of the noise correcting circuit.

Then, in the present technique, instead of the noise correcting circuit 22 depicted in FIG. 1, for example, the noise correcting circuit 22 having a configuration depicted in FIG. 5 is adopted, thereby enabling the low power consumption, and the highly accurate noise correction to be realized. It should be noted that in FIG. 5, portions corresponding to those in case of FIG. 1 are assigned the same reference numerals, and a description thereof is suitably omitted here.

The noise correcting circuit 22 depicted in FIG. 5 has an input sense portion 111, a DC cutting portion 112, a delaying phase adjusting portion 113, a gain adjusting portion 114, a leading phase adjusting portion 115, a constant current source 116, a transistor 117, and a noise monitoring terminal 118.

In this example, the noise monitoring terminal 118 is connected to the pixel power source, and each of the input sense portion 111 and the leading phase adjusting portion 115 is connected to the noise monitoring terminal 118.

The input sense portion 111 has a transistor 121, a transistor 122, a switch 123, a resistor 124, a capacitive element 125, and a resistor 126.

In the input sense portion 111, a current mirror circuit is configured by the transistor 121 and the transistor 122 each including an nMOS transistor, and the switch 123 is provided between gates of the transistor 121 and the transistor 122 connected to each other. It should be noted that although the sizes of the transistor 121 and the transistor 122 are equal to each other, the sizes of the transistor 121 and the transistor 122 may be different from each other.

One end, that is, a source of the transistor 121 is connected to the ground through the resistor 124. The other end, that is, a drain of the transistor 121 is connected to the gate of the transistor 121, and a predetermined power source through the constant current source 116. Here, the predetermined power source, for example, may be the pixel power source or may be any other power source different from the pixel power source.

In addition, one end, that is, a source of the transistor 122 provided on the output side of the current mirror circuit is connected to the ground through the resistor 126. The other end, that is, a drain of the transistor 122 is connected to each of the DC cutting portion 112, the delaying phase adjusting portion 113, and the transistor 117 through a node N11.

Moreover, one electrode of the capacitive element 125 is connected between the gate of the transistor 122 and the switch 123, and the other electrode of the capacitive element 125 is connected to the noise monitoring terminal 118.

The input sense portion 111 having such a configuration monitors the generation of the power source noise in the pixel power source through the noise monitoring terminal 118, and produces the noise correction signal on the basis of the generated power source noise. That is, the input sense portion 111 converts the components of the power source noise transmitted from the pixel power source connected thereto through the noise monitoring terminal 118 from the voltage signal to the current signal. As a result, the current is caused to flow from the transistor 117 side to the transistor 122 through the node N11. In addition, the current is also caused to flow from the DC cutting portion 112 to the transistor 122.

The input sense portion 111, while using a capacitive coupling system by the capacitive element 125 including a capacitor, receives the AC component of the power source noise at the gate of the transistor 122 becoming a bias (output side) of the current mirror.

The gate of the transistor 122 is provided with the switch 123 for carrying out the sampling and holding. For a period of time for which no noise is cancelled, in a word, for a period of time for which no power source noise is corrected, the switch 123 is turned ON, thereby deciding an operating point of the gate. That is, the switch 123 is set to the connection state to apply a voltage to the gate of the transistor 122 in such a way that a current having the same magnitude as that of the current including the DC component and caused to flow through the constant current 116 is caused to flow through the transistor 122 as well.

In addition, for a period of time for which the noise is cancelled, that is, for a period of time for which the noise correction signal is superimposed on the reference signal to correct the power source noise, the switch 123 is kept turned OFF. As a result, the noise of the capacitive coupling, that is, the AC component of the power source noise as the voltage signal detected at the noise monitoring terminal 118 is extracted by the capacitive element 125, and is directly inputted to the gate of the transistor 122. Then, the current including the AC component responding to the AC component of the power source noise, and the DC component determined by the constant current source 116 is caused to flow as the noise correction signal through the transistor 122. As a result, the power source noise which was the voltage signal is converted into the noise correction signal which is the current signal.

The input sense portion 111 having the configuration as described above has the following features.

Firstly, since in the input sense portion 111, the AC component of the power source noise can be converted from the voltage into the current without consuming the current from the noise monitoring terminal 118, a low power consumption of the noise correcting circuit 22 can be realized.

In addition, according to the input sense portion 111, only the AC component of the pixel power source can be extracted. For this reason, since the input sense portion 111 can be used irrespective of the target DC level of the pixel power source, the input sense portion 111 can be applied to the various power sources and thus is excellent in versatility.

Moreover, since the input sense portion 111 has the simple configuration because the amplifier configuration is not adopted, the power consumption in the input sense portion 111 can be reduced to the low level, and the noise can be suppressed from being generated from the input sense portion 111 itself. That is, since the simple configuration is adopted for the input sense portion 111, the low power consumption and the low noise performance of the noise correcting circuit 22 can be realized.

It should be noted that in the input sense portion 111, the gain $\Delta Id/\Delta Vin$ of the power source noise obtained through the voltage-to-current conversion is determined by conductance of the transistor 122 itself, and a resistance value Rin of the resistor 126 on the source side of the transistor 122. Here, $\Delta Id$ in the gain $\Delta Id/\Delta Vin$ is an amount of change in current caused to flow through the transistor 122, and $\Delta Vin$ is an amount of change in gate voltage of the transistor 122.

In the noise correcting circuit 22, a resistance value Rin of the resistor 126, and a resistance value Ro of the resistor 24 as a terminator are equalized to each other, in a word, the same kind of elements are used as the resistor 126 and the resistor 24, thereby enabling the resistance value dispersion element to be cancelled. For this reason, as a ratio of the resistance value Rin is made larger with respect to the conductance of the transistor 122, the dispersion element is reduced. On the other hand, if the resistance value Rin is made too large, then, the gain $\Delta Id/\Delta Vin$ is reduced. Therefore, there is caused necessity for increasing the gain ratio of the gain adjusting portion 114 provided in the final stage, which becomes the factor for amplifying the noise. Therefore, it is only necessary that the resistance value Rin is adjusted in respond to the use application, thereby obtaining the necessary and optimal characteristics. It should be noted that the resistor 124 and the resistor 126 of the input sense portion 111 may not be necessarily provided.

From the foregoing, with regard to the arrangement position of the noise correcting circuit 22, the noise correcting circuit 22 is preferably arranged in a position adjacent to the DAC having the resistor 24 as the terminator.

In addition, the DC cutting portion 112 provided between the transistor 122 and the predetermined power source includes the constant current source 127. The DC cutting portion 112 cuts the DC component becoming the unnecessary current from the noise correction signal as the current obtained through the voltage-to-current conversion by the input sense portion 111.

That is, when the voltage-to-current conversion is carried out, the DC component, that is, the constant current is caused to flow from the constant current source 127 configuring in the DC cutting portion 112 to the transistor 122, and also the current is also caused to flow from the transistor 117 side to the transistor 122 through the node N11.

Therefore, the current caused to flow through the transistor 117 side becomes a current which is obtained by excluding (cutting) the current (DC component) caused to flow through the constant current source 127 from the current obtained through the voltage-to-current conversion, that is, the noise correction signal as the current caused to flow through the transistor 122. In such a manner, the current caused to flow through the transistor 117 side is the noise correction signal from which the DC component is removed away by the DC cutting portion 112.

The delaying phase adjusting portion 113 includes the capacitive element 128 provided between the predetermined power source and the node N11. The delaying phase adjusting portion 113 adjusts the delaying phase in the high-frequency region of the noise correction signal as the current caused to flow from the transistor 117 to the node N11.

That is, the capacitive element 128 of the delaying phase adjusting portion 113 functions as a low-pass filter, and attenuates (the gain of) the AC component of the noise correction signal, thereby carrying out the phase adjustment, in a word, the adjusting of the delaying phase. At this time, a cut-off frequency of the low-pass filter is determined by the capacitance of the capacitive element 128, and the resistance component of the transistor 117.

The gain adjusting portion 114 includes a transistor 129, and adjusts the gain of the DC component in the low-frequency region of the noise correction signal as the current caused to flow through the transistor 117, and outputs the noise correction signal for which the gain adjustment is carried out to the node N12.

Here, the transistor 129 and the transistor 117 configuring the gain adjusting portion 114 include pMOS transistors which are different in size from each other, and the current mirror circuit includes the transistors.

That is, a source of the transistor 117 is connected to the predetermined power source, and a drain of the transistor 117 is connected to each of the node N11 and a gate of the transistor 117. Likewise, a source of the transistor 129 is connected to the predetermined power source, a drain of the transistor 129 is connected to the node N12, and a gate of the transistor 129 is connected to a gate of the transistor 117.

Therefore, a current which is obtained by amplifying the current caused to flow through the transistor 117 in responding to the sizes of the transistor 117 and the transistor 129 is caused to flow as the noise correction signal for which the DC gain in the low-frequency region is adjusted from the transistor 129 to the node N12.

The leading phase adjusting portion 115 includes a capacitive element 130 provided between the noise monitoring terminal 118 and the node N12. The leading phase adjusting portion 115 adjusts the leading phase in the high-frequency region of the noise correction signal as the current caused to flow from the node N12 to the DAC including the constant current source 23 and the resistor 24.

In the leading phase adjusting portion 115, the capacitive element 130 including the capacitor is connected between the node N12 becoming the output terminal of the noise correcting circuit 22, and the pixel power source, thereby propagating the high-pass component of the noise correction signal from the node N12 to the DAC.

That is, the capacitive element 130 of the leading phase adjusting portion 115 functions as a high-pass filter, and attenuates (the gain of) the AC component of the noise correction signal, thereby carrying out the phase adjustment, in a word, the adjustment of the leading phase. At this time, a cut-off frequency of the high-pass filter is determined by the capacitance value of the capacitive element 130, and the resistance value of the resistor 24 as the terminator.

The noise correction signal for which the leading phase is adjusted by the leading phase adjusting portion 115 in such a manner is supplied as the final noise correction signal from the node N12 to the DAC. In such a manner, the leading phase adjusting portion 115 for carrying out the adjustment of the high-pass component is directly provided in the output portion of the noise correcting circuit 22, thereby enabling the noise and the power consumption element of the circuit necessary for obtaining the high-pass characteristics to be reduced.

The noise correction signal obtained in the noise correcting circuit 22 in the manner as described above becomes a signal which has the same amplitude and phase as those of the power source noise which is generated in the pixel power source to be propagated to the comparator 25.

In the noise correcting circuit 22, as has been described so far, the input sense portion 111, the delaying phase adjusting portion 113, and the leading phase adjusting portion 115 are simply configured. Therefore, the generation of the noise in the noise correcting circuit 22 can be suppressed, and the circuit area can also be reduced. If the circuit area of the noise correcting circuit 22 can be reduced, then, the cost down of the image pickup element 11 can also be realized.

Next, an operation of the image pickup element 11 will now be described.

In the case where the image is intended to be photographed by using the image pickup element 11, firstly, the switch 123 of the noise correcting circuit 22 is set in a state in which it is kept turned ON. That is, for a period of time before the correction of the power source noise is carried out, the switch 123 is set in a state in which it is continuously kept turned ON.

In addition, after in the pixel circuit 21, the selection transistor 35 is turned OFF, and each of the transfer transistor 32 and the reset transistor 36 is turned ON, thereby resetting each of the photodiode 31 and the floating diffusion region 33, these transistors are turned OFF to start the exposure.

At the time of the exposure, the photodiode 31 receives the incident light to subject the incident light to the photoelectric conversion, and accumulates the resulting electric charges. When the exposure is ended, the transfer transistor 32 is turned ON to transfer the electric charges in the photodiode 31 to the floating diffusion region 33, and the selection transistor 35 is also turned ON to output the pixel signal to the vertical signal line 26.

At a timing at which the pixel signal is outputted to the vertical signal line 26, the output of the reference signal is started by the DAC including the constant current source 23 and the resistor 24, and the switch 123 is turned OFF in the noise correcting circuit 22 to produce the noise correction signal which is in turn superimposed on the reference signal.

At this time, the input sense portion 111 carries out the voltage-to-current conversion for the power source noise inputted to the noise monitoring terminal 118 to produce the noise correction signal. In addition, the DC cutting portion 112 cuts (removes away) the DC component from the noise correction signal produced in the input sense portion 111, and the delaying phase adjusting portion 113 adjusts the delaying phase of the noise correction signal. That is, the delaying phase adjusting portion 113 adjusts the delaying phase of the noise correction signal by adjusting the gains of the frequency components of the noise correction signal.

Moreover, for the noise correction signal for which the DC component is removed away and the adjustment of the delaying phase is carried out, the gain adjusting portion 114 carries out the gain adjustment, and the leading phase adjusting portion 115 carries out the adjustment of the leading phase, thereby obtaining the final noise correction signal. The leading phase adjusting portion 115 adjusts the gains of the frequency components of the noise correction signal, thereby adjusting the leading phase of the noise correction signal.

The noise correction signal obtained in such a manner is outputted from the node N12 to the DAC to be superimposed on the reference signal.

In addition, the comparator 25 compares the reference signal supplied thereto from the DAC, and the pixel signal supplied thereto from the vertical signal line 26 with each other, and carries out the AD conversion for the pixel signal, thereby outputting the resulting digital pixel signal.

As described above, according to the image pickup element 11, the power source noise can be cancelled with the simpler configuration and the high accuracy. As a result, the higher-quality image can be obtained. In addition, according to the image pickup element 11, the low power consumption and the miniaturization can be realized.

Second Embodiment

<Example of Configuration of Image Pickup Element>

Now, in recent years, there has also been a tendency to adopt a multiple power source configuration in which the power source voltage of the circuit becoming the power consumption portion, and the power source voltage of the pixel are separated from each other, and the optimal power source voltages are inputted to the circuit and the pixels, thereby reducing the power consumption.

The general noise correcting circuit corresponding to such a multiple power source configuration also becomes a primary factor of an increase in power consumption, an increase in noise and an increase in circuit area similarly to the case of the general noise correcting circuit described in the first embodiment.

Even in the case where the image pickup element adopts the multiple power source configuration, if the present technique is applied thereto, the low power consumption, the low noise promotion, and the suppression of the increase in circuit area can be realized.

Figure 6:
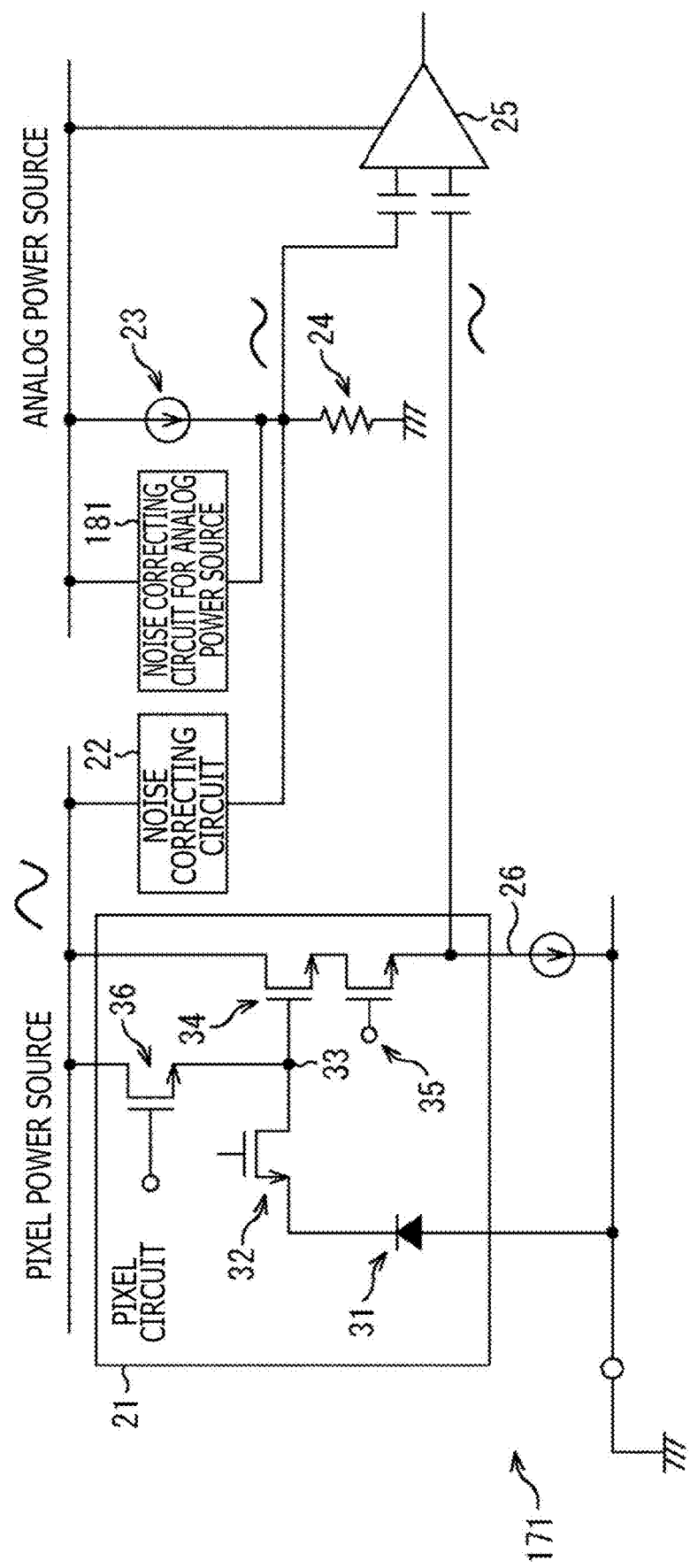
FIG. 6 is a circuit diagram depicting another example of a configuration of the image pickup element.

In the case where an image pickup element has the multiple power source configuration, the image pickup element to which the present technique is applied, for example, is configured as depicted in FIG. 6. It should be noted that in FIG. 6, portions corresponding to those in case of FIG. 1 are assigned the same reference numerals, and a description thereof is suitably omitted here.

An image pickup element 171 depicted in FIG. 6 has the pixel circuit 21, the noise correcting circuit 22, a noise correcting circuit 181 for an analog power source, the constant current source 23, the resistor 24, the comparator 25, and the vertical signal line 26.

It should be noted that although even in the image pickup element 171, similarly to the case of the image pickup element 11, the image pickup element 171 is provided with a plurality of pixel circuits 21, and a plurality of AD converters for AD-converting the outputs from the pixel circuits 21, illustrations thereof are omitted here.

In the image pickup element 171, each of the pixel circuit 21 and the noise correcting circuit 22 for the pixel power source is connected to the pixel power source similarly to the case of FIG. 1. On the other hand, each of the noise correcting circuit 181 for the analog power source, the constant current source 23, and the comparator 25 is connected to the analog power source. In a word, the image pickup element 171 is provided with the pixel power source as the power source for the pixel circuit 21, and the analog power source as the power source for the analog circuit such as the comparator 25 other than the pixel circuit 21.

In this case, as the noise which is propagated through the comparator 25, there are mainly the power source noise, and the analog power source noise. In this case, the power source noise is generated in the pixel power source and is propagated to the comparator 25 through the pixel circuit 21. The analog power source noise is generated in the analog power source and is propagated to the comparator 25 through the constant current source 23. The analog power source noise is superimposed on the reference signal which is produced by the DAC, and is propagated to the comparator 25.

With respect to the power source noise generated in the pixel power source, similarly to the case of the image pickup element 11, the noise correction signal is generated by the noise correcting circuit 22 connected to the pixel power source. The resulting noise correction signal is supplied to the DAC to be superimposed on the reference signal.

In addition, with respect to the analog power source noise generated in the analog power source, the noise correcting circuit 181 for the analog power source is provided between the analog power source and the DAC, and the analog power source noise is cancelled by the analog noise correction signal which is produced by the noise correcting circuit 181 for the analog power source.

That is, the noise correcting circuit 181 for the analog power source monitors the generation of the analog power source noise in the analog power source, and produces the analog noise correction signal for cancelling (correcting) the analog power source noise on the basis of the generated analog power source noise.

Then, the noise correcting circuit 181 for the analog power source inputs the produced analog noise correction signal to the comparator 25 through the DAC, thereby causing the analog power source noise to be cancelled in the comparator 25. In other words, the noise correcting circuit 181 for the analog power source superimposes the analog noise correction signal on the reference signal produced by the DAC, thereby cancelling the analog power source noise superimposed on the reference signal. Therefore, the analog noise correction signal is a signal which has the same amplitude as that of the analog power source noise, and is 180 degrees out of phase with the analog power source noise.

<Example of Configuration of Noise Correcting Circuit for Analog Power Source>

Figure 7:
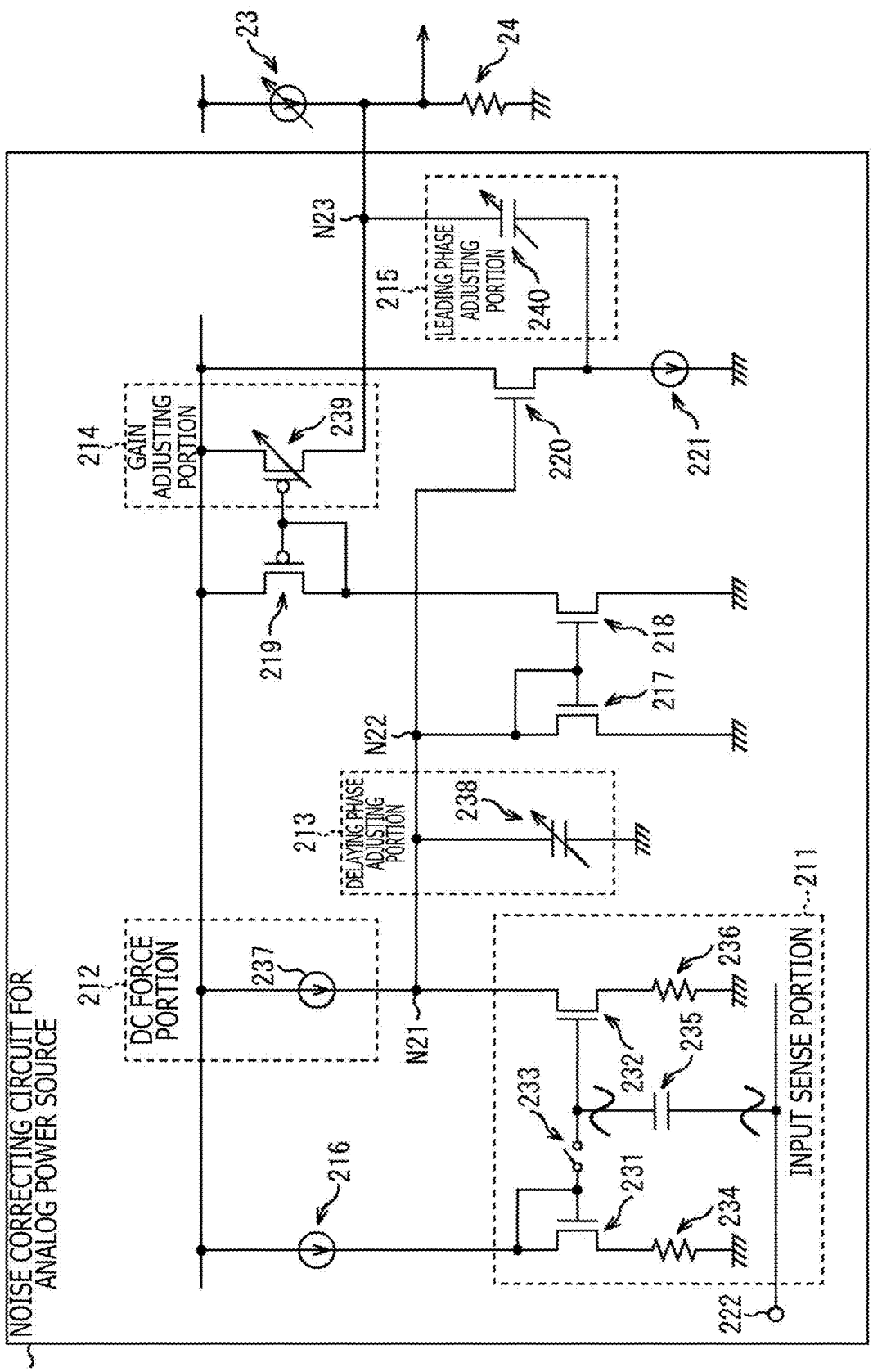
FIG. 7 is a circuit diagram depicting an example of a configuration of a noise correcting circuit for an analog power source.

Next, a description will now be given with respect to a configuration of the noise correcting circuit 181 for the analog power source provided in the image pickup element 171 depicted in FIG. 6. For example, the noise correcting circuit 181 for the analog power source is configured in the manner as depicted in FIG. 7. It should be noted that in FIG. 7, portions corresponding to those in case of FIG. 6 are assigned the same reference numerals, and a description thereof is suitably omitted here.

The noise correcting circuit 181 for the analog power source depicted in FIG. 7 has an input sense portion 211, a DC force portion 212, a delaying phase adjusting portion 213, a gain adjusting portion 214, a leading phase adjusting portion 215, a constant current source 216, a transistor 217, a transistor 218, a transistor 219, a transistor 220, a constant current source 221, and a noise monitoring terminal 222.

In the noise correcting circuit 181 for the analog power source, since the phase needs to be inversed by 180 degrees with respect to an analog power source noise, and a configuration for the phase inversion is further provided in the configuration similar to the noise correcting circuit 22.

In the noise correcting circuit 181 for the analog power source, the noise monitoring terminal 222 is connected to the analog power source, and the input sense portion 211 is connected to the noise monitoring terminal 222.

The input sense portion 211 has a transistor 231, a transistor 232, a switch 233, a resistor 234, a capacitive element 235, and a resistor 236. Since the connection relationship and the operation of the transistor 231 to the resistor 236 are similar to those of the transistor 121 to the resistor 126 of the input sense portion 111 depicted in FIG. 5, a description thereof is omitted here.

However, in this example, a predetermined power source is connected to a drain of the transistor 231 through the constant current source 216. The constant current source 216 corresponds to the constant current source 116 of the noise correcting circuit 22 depicted in FIG. 5. The predetermined power source to which the constant current source 216 is connected, for example, may be an analog power source or may be a power source different from the analog power source.

Each of the DC force portion 212 and the delaying phase adjusting portion 213 is connected to a drain of the transistor 232 through the node N21.

The DC force portion 212 includes the constant current source 237 provided between the transistor 232 and the predetermined power source. The DC force portion 212 forces the current including only the DC component to the node N21 provided between the DC force portion 212 and the transistor 232, thereby inverting the phase of the analog noise correction signal produced in the input sense portion 211.

Specifically, when the voltage-to-current conversion is carried out in the input sense portion 211, the DC component, that is, the constant current is caused to flow from the constant current source 237 configuring the DC force portion 212 to the node N21. At this time, since as a result of the voltage-to-current conversion, the current as the analog noise correction signal is caused to flow through the transistor 232, only the current obtained by subtracting the current caused to flow to the transistor 232 from the current caused to flow from the constant current source 237 to the node N21 is caused to flow to the node N22 side.

That is, the current caused to flow from the node N21 to the node N22 is obtained by removing away the analog noise correction signal obtained through the voltage-to-current conversion, that is, the current caused to flow through the transistor 232 from the current (DC component) caused to flow through the constant current source 237.

In such a manner, the DC force portion 212 causes (forces) the larger current than the current caused to flow through the transistor 232 to flow through the node N21 connected to the transistor 232, thereby inverting the phase of the current as the analog noise correction signal obtained in the input sense portion 211. As a result, the current obtained by inverting the phase of the analog noise correction signal obtained in the input sense portion 211 is caused to flow as the analog noise correction signal after the phase inversion from the node N21 to the node N22. The analog noise correction signal after the phase inversion is a signal which is 180 degrees out of phase with the analog power source noise.

The delaying phase adjusting portion 213 includes a capacitive element 238 provided between the ground and the node N21. The delaying phase adjusting portion 213 adjusts the delaying phase in the high-frequency region of the analog noise correction signal caused to flow from the node N21 to the node N22.

That is, the capacitive element 238 of the delaying phase adjusting portion 213 functions as the low-pass filter, and attenuates the AC component of the analog noise correction signal, thereby carrying out the phase adjustment, in a word, the adjustment of the delaying phase. At this time, a cut-off frequency of the low-pass filter is determined by a capacitance of the capacitive element 238 and a resistance component of the transistor 217.

In addition, the transistor 217 is connected to the node N22, and the transistor 217 and the transistor 218 configure a current mirror circuit. That is, a drain and a source of the transistor 217 are respectively connected to the node N22 and the ground, and the drain and a gate of the transistor 217 are also connected to each other.

A drain and a source of the transistor 218 are respectively connected to a drain of the transistor 219 and the ground, and a gate of the transistor 218 is connected to a gate of the transistor 217. The transistor 217 and the transistor 218 are transistors having the same size.

Therefore, the same current as the current, as the analog noise correction signal, which is caused to flow through the node N22 is caused to flow from the transistor 219 to the transistor 218. That is, the analog noise correction signal is copied to the transistor 218 side.

The gain adjusting portion 214 includes a transistor 239, and adjusts the gain of the DC component in the low-frequency region of the analog noise correction signal as the current caused to flow through the transistor 219, and outputs the analog noise correction signal for which the gain adjustment is carried out to the node N23.

Here, the transistor 239 and the transistor 219 configuring the gain adjusting portion 214 include pMOS transistors having difference sizes which configure in turn a current mirror circuit.

That is, a source of the transistor 219 is connected to a predetermined power source, and a drain of the transistor 219 is connected to each of a drain of the transistor 218 and a gate of the transistor 219. Likewise, a source of the transistor 239 is connected to a predetermined power source, a drain of the transistor 239 is connected to the node N23, and a gate of the transistor 239 is connected to a gate of the transistor 219.

Therefore, a current which is obtained by amplifying the current caused to flow through the transistor 219 in response to the sizes of the transistor 219 and the transistor 239 is caused to flow as the analog noise correction signal for which the DC gain in the low-frequency region is adjusted from the transistor 239 to the node N23.

The leading phase adjusting portion 215 includes a capacitive element 240, and adjusts the leading phase in the high-frequency region of the analog noise correction signal as the current which is caused to flow from the node N23 to the DAC including the constant current source 23 and the resistor 24.

In the leading phase adjusting portion 215, the capacitive element 240 including a capacitor is connected between the node N23 becoming an output terminal of the noise correcting circuit 181 for the analog power source, and the ground, thereby propagating the high-pass component of the analog noise correction signal from the node N23 to the DAC.

That is, one electrode (terminal) of the capacitor as the capacitive element 240 is connected to the node N23, and the other electrode of the capacitor as the capacitive element 240 is connected to the ground through the constant current source 221. In addition, the other electrode of the capacitor as the capacitive element 240 is also connected to the transistor 220.

One end of the transistor 220 is connected to the predetermined power source, and the other end of the transistor 220 is connected to the capacitive element 240. Moreover, a gate of the transistor 220 is connected to the node N22. The transistor 220 functions as a buffer in order for the analog noise correction signal caused to flow through the node N22 to be prevented from being influenced by the voltage change of the DAC.

The capacitive element 240 of the leading phase adjusting portion 215 functions as a high-pass filter, and attenuates the AC component of the analog noise correction signal, thereby carrying out the phase adjustment, in a word, the adjustment of the leading phase. At this time, the cut-off frequency of the high-pass filter is determined by the capacitance of the capacitive element 240, and the resistance value of the resistor 24 as the terminator.

The analog noise correction signal for which the leading phase is adjusted by the leading phase adjusting portion 215 in such a manner is supplied as the final analog noise correction signal from the node N23 to the DAC. The leading phase adjusting portion 215 for carrying out the adjustment of the high-pass components is directly provided in the output portion of the noise correcting circuit 181 for the analog power source, thereby enabling the noise and power consumption element of the circuit necessary for obtaining the high-pass characteristics to be reduced.

The analog noise correction signal obtained in the noise correcting circuit 181 for the analog power source in the manner described above becomes the signal which has the same amplitude as that of the analog power source noise generated in the analog power source and has the phase obtained by inverting the phase of the analog power source noise, in a word, 180 degrees out of phase with the phase of the analog power source noise.

The noise correcting circuit 181 for the analog power source, similarly to the case of the noise correcting circuit 22, has the simple configuration. Therefore, the generation of the noise in the noise correcting circuit 181 for the analog power source can be suppressed, and the circuit area can also be reduced. If the circuit area of the noise correcting circuit 181 for the analog power source can be reduced, then, the reduction in cost of the image pickup element 171 can be realized.

Subsequently, an operation of the image pickup element 171 will be described.

In the image pickup element 171, the photographing is carried out similarly to the case of the image pickup element 11, and the pixel signal obtained in the pixel circuit 21 is supplied to the comparator 25 through the vertical signal line 26. It should be noted that at the time of start of the photographing, the switch 123 of the noise correcting circuit 22 is turned ON, and the switch 233 of the noise correcting circuit 181 for the analog power source is also turned ON.

In addition, a timing at which the pixel signal is outputted to the vertical signal line 26, the output of the reference signal is started by the DAC, and the noise correction signal is produced by the noise correcting circuit 22 and is then superimposed on the reference signal. At this time, in the noise correcting circuit 181 for the analog power source, the switch 233 is turned OFF, and the processing for producing the analog noise correction signal, and superimposing the resulting analog noise correction signal on the reference signal.

That is, the input sense portion 211 carries out the voltage-to-current conversion for the analog power source noise inputted to the noise monitoring terminal 222 to produce the analog noise correction signal. In addition, for the analog noise correction signal produced in the input sense portion 211, the DC force portion 212 carries out the inversion of the phase, and the delaying phase adjusting portion 213 carries out the adjustment of the phase. That is, the delaying phase adjusting portion 213 adjusts the gain of the frequency components of the analog noise correction signal, thereby carrying out the adjustment of the delaying phase of the analog noise correction signal.

Moreover, for the analog noise correction signal for which the adjustment of the delaying phase is carried out, the gain adjusting portion 214 carries out the gain adjustment and the leading phase adjusting portion 215 carries out the adjustment of the leading phase, thereby obtaining the final analog noise correction signal. In the leading phase adjusting portion 215, the gains of the frequency components of the analog noise correction signal are adjusted, thereby carrying out the adjustment of the leading phase of the analog noise correction signal.

The analog noise correction signal obtained in such a manner is outputted from the node N23 to the DAC, and is then superimposed on the reference signal.

When the analog noise correction signal and the noise correction signal are both superimposed on the reference signal in the manner as described above, the comparator 25 carries out the AD conversion for the pixel signal, and the resulting digital pixel signal is outputted.

Third Embodiment

<Example of Configuration of Noise Correcting Circuit>

In addition, in the first embodiment and the second embodiment described above, the description has been given with respect to the case where the noise correcting circuit 22 has the configuration depicted in FIG. 5. However, the noise correcting circuit 22 is by no means limited to the configuration depicted in FIG. 5, and any other configuration may also be adopted.

Figure 8:
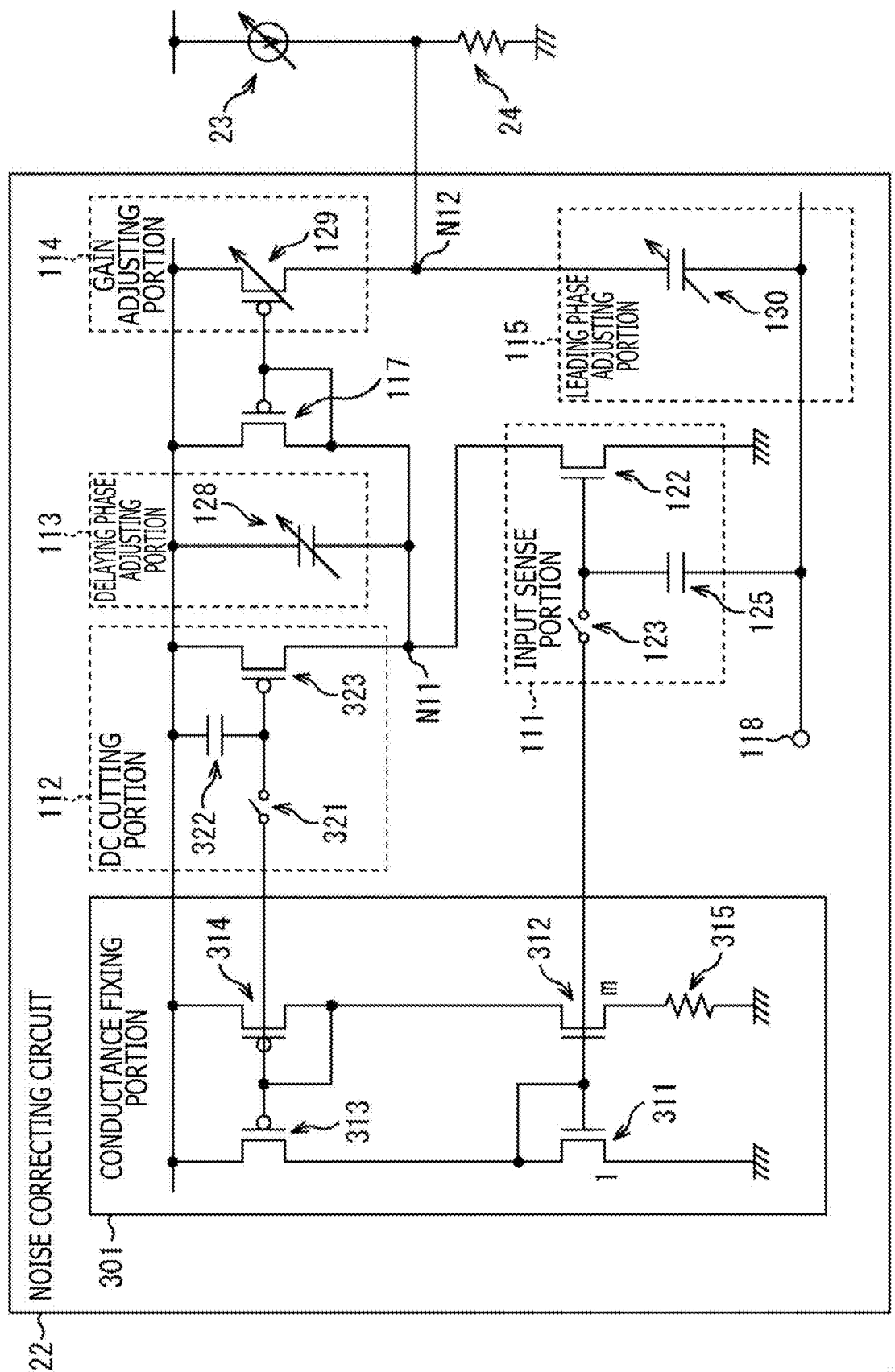
FIG. 8 is a circuit diagram depicting another example of the configuration of the noise correcting circuit.

In such a case, the noise correcting circuit 22, for example, can have a configuration depicted in FIG. 8. It should be noted that in FIG. 8, portions corresponding to those in case of FIG. 5 are assigned the same reference numerals, and a description thereof is suitably omitted here.

The noise correcting circuit 22 depicted in FIG. 8 has the input sense portion 111, a conductance fixing portion 301, the DC cutting portion 112, the delaying phase adjusting portion 113, the gain adjusting portion 114, the leading phase adjusting portion 115, the transistor 117, and the noise monitoring terminal 118.

In this example, the noise monitoring terminal 118 is connected to the pixel power source, and each of the input sense portion 111 and the leading phase adjusting portion 115 is connected to the noise monitoring terminal 118.

In addition, the configuration of the noise correcting circuit 22 depicted in FIG. 8 is different from the configuration of the noise correcting circuit 22 of FIG. 5 only in that instead of the constant current source 116, the conductance fixing portion 301 is provided, and the internal configurations of the input sense portion 111 and the DC cutting portion 112 are different from those of the example of FIG. 5.

The conductance fixing portion 301 has a current mirror circuit including the transistor 311 and the transistor 312, and a current mirror circuit including the transistor 313 and the transistor 314.

That is, the transistor 311 and the transistor 312 include nMOS transistors, and the size of the transistor 312 is m times as large as that of transistor 311. In addition, the gates of the transistor 311 and the transistor 312 are connected to each other.

A source of the transistor 311 is connected to the ground, and a drain of the transistor 311 is connected to the gate of the transistor 311. A source of the transistor 312 is connected to the ground through the resistor 315.

In addition, the transistor 313 and the transistor 314 include pMOS transistors and the sizes of the transistor 313 and the transistor 314 equal to each other. Moreover, the gates of the transistor 313 and the transistor 314 are connected to each other.

A source of the transistor 313 is connected to a power source VDDH of a predetermined voltage, and a drain of the transistor 313 is connected to a drain of the transistor 311. It should be noted that the power source VDDH may be the pixel power source or may be any other power source different from the pixel power source.

A source of the transistor 314 is connected to the power source VDDH, and a drain of the transistor 314 is connected to a drain of the transistor 312. In addition, the drain of the transistor 314 is also connected to a gate of the transistor 314.

In the conductance fixing portion 301 having such a circuit configuration, the conductance of the transistor 312 is constant. The conductance is determined by m as a ratio of the size of the transistor 312 to the size of the transistor 311, and the resistance value of the resistor 315.

In addition, in the noise correcting circuit 22 depicted in FIG. 8, the input sense portion 111 includes the transistor 122, the switch 123, and the capacitive element 125.

In this example, the gate of the transistor 312 configuring the conductance fixing portion 301 is connected to the gate of the transistor 122 through the switch 123 for carrying out the sampling and holding.

In addition, the source of the transistor 122 is connected to the ground, and the drain of the transistor 122 is connected to each of the DC cutting portion 112, the delaying phase adjusting portion 113, and the transistor 117 through the node N11.

Moreover, one electrode of the capacitive element 125 is connected between the gate of the transistor 122, and the switch 123, and the other electrode of the capacitive element 125 is connected to the noise monitoring terminal 118.

In the input sense portion 111 having such a configuration, for example, for a period of time for which no noise is cancelled, in a word, for a period of time for which no correction of the power source noise is carried out, the switch 123 is turned ON, thereby deciding the operating point of the gate. That is, in such a state, the current responding to the current caused to flow through the transistor 312 is caused to flow through the transistor 122.

In addition, for a period of time for which the noise is cancelled, that is, for a period of time for which the noise correction signal is superimposed on the reference signal, thereby carrying out the correction of the power source noise, the switch 123 is kept turned OFF. When such a state is set, the AC component of the power source noise detected at the noise monitoring terminal 118 is extracted by the capacitive element 125 and is directly inputted to the gate of the transistor 122. Then, the current including the AC component corresponding to the AC component of the power source noise, and the DC component decided by the transistor 312 is caused to flow as the noise correction signal through the transistor 122. As a result, the power source noise as the voltage signal is converted into the noise correction signal as the current signal.

In this case, since the conductance of the transistor 312 becomes usually constant (fixed), the conductance of the transistor 122 also becomes a constant value. Therefore, since the dispersion of the gain $\Delta Id/\Delta Vin$ in the voltage-to-current conversion can be suppressed, the resistor 126 does not need to be provided between the transistor 122 and the ground. As a result, since the gain $\Delta Id/\Delta Vin$ is increased, the low power consumption and low noise promotion of the input sense portion 111 can be realized.

The DC cutting portion 112 has a switch 321, a capacitive element 322, and a transistor 323. In this example, the transistor 323 includes a pMOS transistor.

The switch 321 is connected between the capacitive element 322 and the transistor 323, and the gate of the transistor 314. In addition, one electrode of the capacitive element 322 is connected to the power source VDDH, and the other electrode of the capacitive element 322 is connected to the switch 321.

A source of the transistor 323 is connected to the power source VDDH, and a drain of the transistor 323 is connected to the node N11. In addition, a gate of the transistor 323 is connected to the switch 321.

In such a DC cutting portion 112, the transistor 323 is usually kept turned ON, and a current such that the conductance of the transistor 122 becomes a constant value is usually caused to flow from the transistor 323 to the node N11.

Therefore, the current caused to flow through the transistor 117 side becomes a current which is obtained by removing away (cutting) the current (DC component) caused to flow from the transistor 323 to the node N11 from the noise correction signal as the current caused to flow through the transistor 122. In such a manner, the current caused to flow through the transistor 117 side becomes the noise correction signal from which the DC component is removed away by the DC cutting portion 112.

In addition, in the DC cutting portion 112, for a period of time for which no noise is cancelled, the switch 321 is in the connection state, in a word, the switch 321 is kept turned ON, and for a period of time for which the noise is cancelled, the switch 321 is in the non-connection state, in a word, the switch 321 is kept turned OFF.

In such a manner, for a period of time for which the noise is cancelled, the switch 321 is turned OFF, resulting in that the noise outputted from the conductance fixing portion 301 can be prevented from being outputted to the node N11 through the transistor 323 to be superimposed on the noise correction signal. It should be noted that the switch 321 does not need to be necessarily provided.

Next, a description will be given with respect to an operation of the image pickup element 11 in the case where the noise correcting circuit 22 has the configuration depicted in FIG. 8.

In the case where the image is photographed by using the image pickup element 11, firstly, each of the switch 123 and the switch 321 of the noise correcting circuit 22 is turned ON. That is, for a period of time before the power source noise is corrected, each of the switch 123 and the switch 321 is continuously kept turned ON.

Then, when the photographing is carried out, the pixel signal obtained in the pixel circuit 21 is supplied to the comparator 25 through the vertical signal line 26. In addition, at a timing at which the pixel signal is outputted to the vertical signal line 26, the output of the reference signal is started by the DAC, and each of the switch 123 and the switch 321 is turned OFF in the noise correcting circuit 22 to produce the noise correction signal which is in turn superimposed on the reference signal.

At this time, the input sense portion 111 carries out the voltage-to-current conversion for the power source noise inputted to the noise monitoring terminal 118 to produce the noise correction signal. That is, since the voltage which is applied to the gate of the transistor 122 is changed in response to the AC component of the power source noise extracted by the capacitive element 125, the transistor 122 produces the current responding to the charge in voltage concerned as the noise correction signal.

In addition, the DC cutting portion 112 cuts (removes) the DC component from the noise correction signal produced in the input sense portion 111, and the delaying phase adjusting portion 113 carries out the adjustment of the delaying phase of the noise correction signal.

The gain adjusting portion 114 carries out the gain adjustment for the noise correction signal from which the DC component is removed away and for which the adjustment of the delaying phase is carried out. In addition, the leading phase adjusting portion 115 carries out the adjustment of the leading phase for the noise correction signal, which in turn becomes the final noise correction signal.

The noise correction signal obtained in such a manner is outputted from the node N12 to the DAC to be superimposed on the reference signal.

In addition, the comparator 25 compares the reference signal supplied thereto from the DAC and the pixel signal supplied thereto from the vertical signal line 26 with each other to carry out the AD conversion for the pixel signal, thereby outputting the resulting digital pixel signal.

As described above, according to the image pickup element 11, the power source noise can be cancelled with the simpler configuration and with high accuracy. As a result, the higher-quality image can be obtained. In addition, according to the image pickup element 11, the low power consumption and the miniaturization can be realized. It should be noted that although the image pickup element 11 has been described here, even in the case where the noise correcting circuit 22 of the image pickup element 171 depicted in FIG. 6 has the configuration depicted in FIG. 8, the similar operation is carried out in the noise correcting circuit 22.

<Example of Configuration of Image Pickup Apparatus>

Moreover, the present technique can be applied to the whole electronic apparatuses, each using the image pickup element in the photoelectric conversion portion, such as an image pickup apparatus such as a digital still camera or a video camera, a mobile terminal device having an image pickup function, or a copying machine using an image pickup element in an image reading portion.

Figure 9:
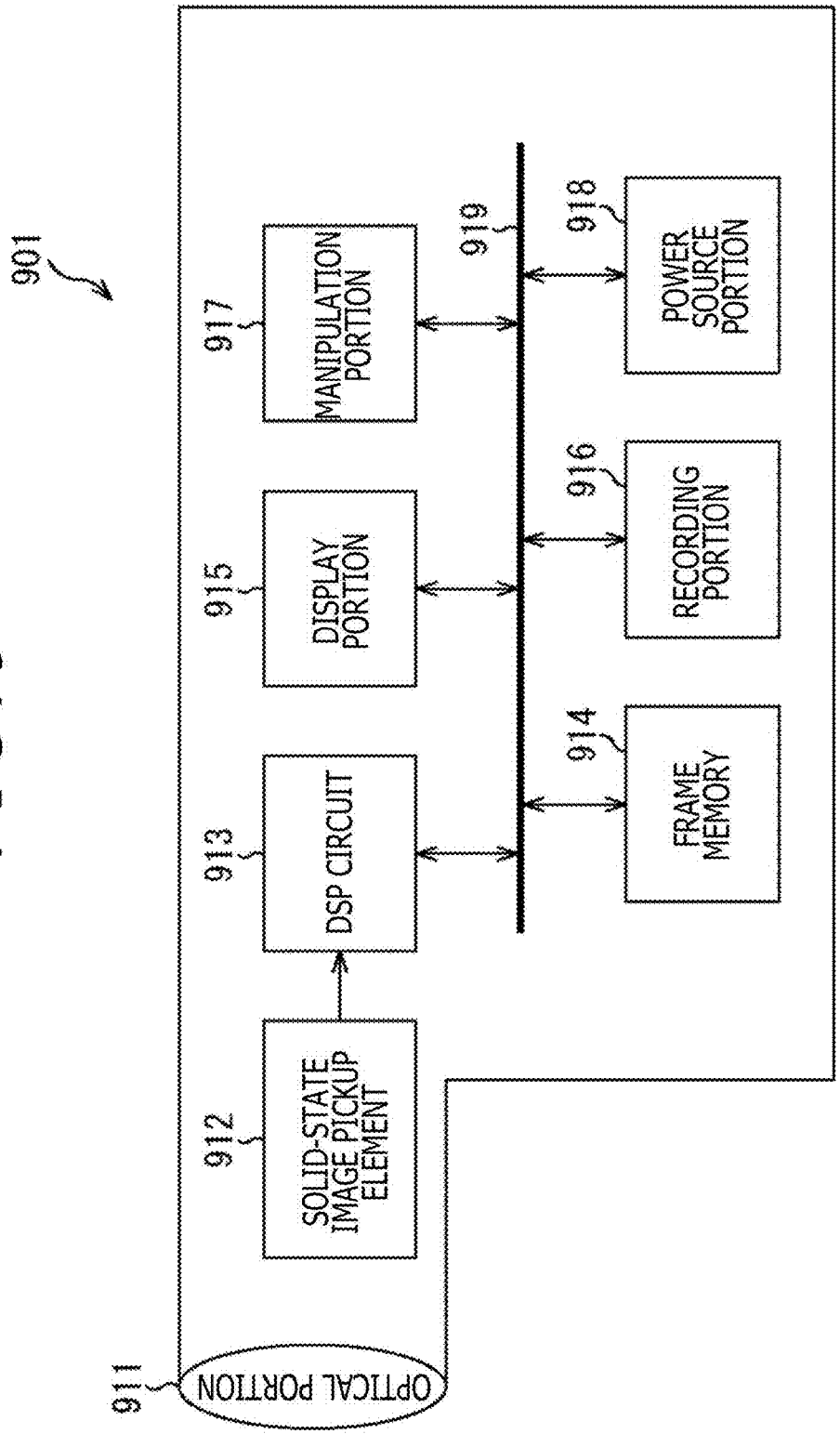
FIG. 9 is a block diagram depicting an example of a configuration of an image pickup apparatus.

FIG. 9 is a block diagram depicting an example of a configuration of an image pickup apparatus as an electronic apparatus to which the present technique is applied.

An image pickup apparatus 901 of FIG. 9 is provided with an optical portion 911 including a lens group and the like, a solid-state image pickup element (image pickup device) 912, and a DSP (Digital Signal Processor) circuit 913 as a camera signal processing circuit. In addition, the image pickup apparatus 901 is also provided with a frame memory 914, a display portion 915, a recording portion 916, a manipulation portion 917, and a power source portion 918. The DSP circuit 913, the frame memory 914, the display portion 915, the recording portion 916, the manipulation portion 917, and the power source portion 918 are connected to one another through a bus line 919.

The optical portion 911 captures incident light (image light) from a subject to image the incident light on an imaging surface of the solid-state image pickup element 912. The solid-state image pickup element 912 converts quantity of incident light imaged on the imaging surface by the optical portion 911 into an electrical signal in units of pixels to output the resulting electrical signal as a pixel signal. The solid-state image pickup element 912 corresponds to the image pickup element 11 depicted in FIG. 1 or the image pickup element 171 depicted in FIG. 6.

The display portion 915, for example, includes a panel type display device such as a liquid crystal panel or an organic EL (electro luminescence) panel, and displays thereon a moving image or a still image photographed by the solid-state image pickup element 912. The recording portion 916 records a moving image or a still image photographed by the solid-state image pickup element 912 in a recording media such as a video tape or a DVD (Digital Versatile Disk).

The manipulation portion 917 issues manipulation instructions with respect to various functions which the image pickup apparatus 901 has under the manipulation made by a user. The power source portion 918 suitably supplies various kinds of power sources becoming operation power sources of the DSP circuit 913, the frame memory 914, the display portion 915, the recording portion 916, the manipulation portion 917 to these supply targets.

It should be noted that in the embodiments described above, the description has been given by giving, as the example, the case where the present technique is applied to the CCD or the CMOS image sensor in which the pixels for detecting the signal electric charges responding to the quantities of visible light as the physical quantities are arranged in a matrix. However, the present technique is by no means limited to these applications, but can be applied to the whole solid-state image pickup elements.

<Examples of Use of Image Pickup Element>

FIG. 10 is a view depicting examples of use in which the solid-state image pickup element (image sensor) such as the image pickup element 11 or the image pickup element 171 described above is used.

The solid-state image pickup element described above, for example, as will be described below, can be used in such various cases as to sense the light such as visible light, infrared radiation, ultraviolet rays, and X-rays.

An apparatus, for photographing an image for use in appreciation, such as a digital camera or a portable apparatus with a camera function An apparatus, for use in traffic, such as an on-board sensor for photographing, a front side, a rear side, a periphery, a car interior for safe driving such as automatic stop, recognition or the like of a state of a driver, or the like a monitoring camera for monitoring a road for a travelling vehicle, or a distance measuring sensor for measuring a distance between vehicles An apparatus, for use in a consumer electronics, such as a TV, a refrigerator or an air conditioner, for imaging a gesture of a user to carry out an apparatus operation responding to the gesture An apparatus, for use in medical care or health care, such as an endoscope, or an apparatus for photographing a blood vessel by receiving infrared rays An apparatus, for use in security, such as a monitoring camera for security applications, or a camera for person authentication applications An apparatus, for use in beauty, such as a skin measuring instrument for photographing a skin, or a microscope for photographing a scalp An apparatus, for sport, such as an action camera or a wearable camera for sport applications An apparatus, for use in agriculture, such as a camera for monitoring a state of a field or crops In addition, the embodiments of the present technique are by no means limited to the embodiments described above, and various changes can be made without departing from the subject matter of the present technique.

Moreover, the present technique can also adopt the following constitutions.

(1)

An image pickup element including:

an input sense portion configured to produce a noise correction signal for correcting a noise generated in a predetermined power source;

the input sense portion having a first transistor and a second transistor configuring a current mirror circuit, a switch provided between a gate of the first transistor and a gate of the second transistor, and a capacitive element one electrode of which is connected between the switch and the gate of the second transistor on an output side of the current mirror circuit, and the other electrode of which is connected to the predetermined power source.

(2)

The image pickup element according to (1), in which the switch is turned ON for a period of time before correction of the noise is carried out, and is turned OFF for a period of time for which the correction of the noise is carried out.

(3)

The image pickup element according to (1) or (2), in which the input sense portion further includes a first resistor connected between the first transistor and a ground, and a second resistor connected between the second transistor and the ground.

(4)

The image pickup element according to any one of (1) to (3), further including:

a delaying phase adjusting portion which includes a capacitive element and carries out adjustment of a delaying phase of the noise correction signal produced by the input sense portion.

(5)

The image pickup element according to any one of (1) to (4), further including:

a leading phase adjusting portion which includes a capacitive element and carries out adjustment of a leading phase of the noise correction signal produced by the input sense portion.

(6)

The image pickup element according to any one of (1) to (5), further including:

a gain adjusting portion configured to adjust a DC gain of the noise correction signal.

(7)

The image pickup element according to any one of (1) to (6), further including:

a DC cutting portion configured to cut a DC component of the noise correction signal produced by the input sense portion.

(8)

The image pickup element according to any one of (1) to (7), further including:

a pixel circuit which is connected to the predetermined power source, subjects incident light to photoelectric conversion, and outputs a pixel signal responding to quantity of the received light;

a reference signal producing portion configured to produce a reference signal a waveform of which is changed in a form of a slope; and a comparator configured to compare the reference signal on which the noise correction signal is superimposed, and the pixel signal with each other, and output the comparison result as a digital pixel signal.

(9)

The image pickup element according to any one of (1) to (6), further including:

a DC force portion configured to force a current and invert a phase of the noise correction signal produced by the input sense portion.

(10)

The image pickup element according to (9), further including:

a pixel circuit which is connected to a power source different from the predetermined power source, subjects incident light to photoelectric conversion, and outputs a pixel signal responding to quantity of the received light;

a reference signal producing portion which is connected to the predetermined power source and produces a reference signal a waveform of which is changed in a form of a slope; and a comparator configured to compare the reference signal on which the noise correction signal a phase of which is inverted by the DC force portion is superimposed, and the pixel signal with each other, and output the comparison result as a digital pixel signal.

(11)

An electronic apparatus including:

an input sense portion configured to produce a noise correction signal for correcting a noise generated in a predetermined power source;

the input sense portion having a first transistor and a second transistor configuring a current mirror circuit, a switch provided between a gate of the first transistor and a gate of the second transistor, and a capacitive element one electrode of which is connected between the switch and the gate of the second transistor on an output side of the current mirror circuit, and the other electrode of which is connected to the predetermined power source.

(12)

An image pickup element including:

an input sense portion configured to produce a noise correction signal for correcting a noise generated in a predetermined power source;

the input sense portion having a second transistor connected to a gate of a first transistor conductance of which is made constant, a switch provided between the gate of the first transistor and a gate of the second transistor, and a capacitive element one electrode of which is connected between the switch and the gate of the second transistor, and the other electrode of which is connected to the predetermined power source.

(13)

The image pickup element according to (12), in which the switch is turned ON for a period of time before correction of the noise is carried out, and is turned OFF for a period of time for which the correction of the noise is carried out.

(14)

The image pickup element according to (12) or (13), further including:

a delaying phase adjusting portion which includes a capacitive element and carries out adjustment of a delaying phase of the noise correction signal produced by the input sense portion.

(15)

The image pickup element according to any one of (12) to (14), further including:

a leading phase adjusting portion which includes a capacitive element and carries out adjustment of a leading phase of the noise correction signal produced by the input sense portion.

(16)

The image pickup element according to any one of (12) to (15), further including:

a gain adjusting portion configured to adjust a DC gain of the noise correction signal.

(17)

The image pickup element according to any one of (12) to (16), further including:

a DC cutting portion configured to cut a DC component of the noise correction signal produced by the input sense portion.

(18)

The image pickup element according to any one of (12) to (17), further including:

a pixel circuit which is connected to the predetermined power source, subjects incident light to photoelectric conversion, and outputs a pixel signal responding to quantity of the received light;

a reference signal producing portion configured to produce a reference signal a waveform of which is changed in a form of a slope; and a comparator configured to compare the reference signal on which the noise correction signal is superimposed, and the pixel signal with each other, and output the comparison result as a digital pixel signal.

REFERENCE SIGNS LIST

11 . . . Image pickup element, 21 . . . Pixel circuit, 22 . . . Noise correcting circuit, 23 . . . Constant current source, 24 . . . Resistor, 25 . . . Comparator, 111 . . . Input sense portion, 113 . . . Delaying phase adjusting portion, 114 . . . Gain adjusting portion, 115 . . . Leading phase adjusting portion, 121 . . . Transistor, 122 . . . Transistor, 123 . . . Switch, 124 . . . Resistor, 125 . . . Capacitive element, 126 . . . Resistor, 128 . . . Capacitive element, 130 . . . Capacitive element, 181 . . . Noise correcting circuit for analog power source, 211 . . . Input sense portion, 213 . . . Delaying phase adjusting portion, 214 . . . Gain adjusting portion, 215 . . . Leading phase adjusting portion

The invention claimed is:

1. An image pickup element comprising:

an input sense portion configured to produce a noise correction signal for correcting a noise generated in a predetermined power source;

the input sense portion having a first transistor and a second transistor configuring a current mirror circuit, a switch provided between a gate of the first transistor and a gate of the second transistor, a capacitive element one electrode of which is connected between the switch and the gate of the second transistor on an output side of the current mirror circuit, and the other electrode of which is connected to the predetermined power source, a first resistor connected between the first transistor and a ground, and a second resistor connected between the second transistor and the ground.

2. The image pickup element according to claim 1, wherein the switch is configured to receive a control signal such that the switch is turned ON for a period of time before correction of the noise is carried out, and is turned OFF for a period of time for which the correction of the noise is carried out.

3. The image pickup element according to claim 1, further comprising:

a delaying phase adjusting portion which includes a capacitive element and carries out adjustment of a delaying phase of the noise correction signal produced by the input sense portion.

4. The image pickup element according to claim 1, further comprising:

a leading phase adjusting portion which includes a capacitive element and carries out adjustment of a leading phase of the noise correction signal produced by the input sense portion.

5. The image pickup element according to claim 1, further comprising:

a gain adjusting portion configured to adjust a DC gain of the noise correction signal.

6. The image pickup element according to claim 1, further comprising:

a DC cutting portion configured to cut a DC component of the noise correction signal produced by the input sense portion.

7. The image pickup element according to claim 1, further comprising:

a pixel circuit which is connected to the predetermined power source, subjects incident light to photoelectric conversion, and outputs a pixel signal responding to quantity of the received light;

a reference signal producing portion configured to produce a reference signal a waveform of which is changed in a form of a slope; and a comparator configured to compare the reference signal on which the noise correction signal is superimposed, and the pixel signal with each other, and output the comparison result as a digital pixel signal.

8. The image pickup element according to claim 1, further comprising:

a DC force portion configured to force a current and invert a phase of the noise correction signal produced by the input sense portion.

9. The image pickup element according to claim 8, further comprising:
a pixel circuit which is connected to a power source different from the predetermined power source, subjects incident light to photoelectric conversion, and outputs a pixel signal responding to quantity of the received light;
a reference signal producing portion which is connected to the predetermined power source and produces a reference signal a waveform of which is changed in a form of a slope; and
a comparator configured to compare the reference signal on which the noise correction signal a phase of which is inverted by the DC force portion is superimposed, and the pixel signal with each other, and output the comparison result as a digital pixel signal.

10. An electronic apparatus comprising:
a pixel circuit which is connected to a predetermined power source; and
an input sense portion configured to produce a noise correction signal for correcting a noise generated in the predetermined power source;
the input sense portion having
a first transistor and a second transistor configuring a current mirror circuit,
a switch provided between a gate of the first transistor and a gate of the second transistor,
a capacitive element one electrode of which is connected between the switch and the gate of the second transistor on an output side of the current mirror circuit, and the other electrode of which is connected to the predetermined power source,
a first resistor connected between the first transistor and a ground, and
a second resistor connected between the second transistor and the ground.

11. An image pickup element comprising:
an input sense portion configured to produce a noise correction signal for correcting a noise generated in a predetermined power source;
the input sense portion having
a second transistor connected to a gate of a first transistor conductance of which is made constant,
aa switch provided between the gate of the first transistor and a gate of the second transistor,
a capacitive element one electrode of which is connected between the switch and the gate of the second transistor, and the other electrode of which is connected to the predetermined power source, and
a delaying phase adjusting portion which includes a capacitive element and carries out adjustment of a delaying phase of the noise correction signal produced by the input sense portion.

12. The image pickup element according to claim 11, wherein the switch is configured to receive a control signal such that the switch is turned ON for a period of time before correction of the noise is carried out, and is turned OFF for a period of time for which the correction of the noise is carried out.

13. The image pickup element according to claim 11, further comprising:
a leading phase adjusting portion which includes a capacitive element and carries out adjustment of a leading phase of the noise correction signal produced by the input sense portion.

14. The image pickup element according to claim 11, further comprising:
a gain adjusting portion configured to adjust a DC gain of the noise correction signal.

15. The image pickup element according to claim 11, further comprising:
a DC cutting portion configured to cut a DC component of the noise correction signal produced by the input sense portion.

16. The image pickup element according to claim 11, further comprising:
a pixel circuit which is connected to the predetermined power source, subjects incident light to photoelectric conversion, and outputs a pixel signal responding to quantity of the received light;
a reference signal producing portion configured to produce a reference signal a waveform of which is changed in a form of a slope; and
a comparator configured to compare the reference signal on which the noise correction signal is superimposed, and the pixel signal with each other, and output the comparison result as a digital pixel signal.

* * * * *